(12) United States Patent
Moore et al.

(10) Patent No.: US 9,727,429 B1
(45) Date of Patent: Aug. 8, 2017

(54) METHOD AND SYSTEM FOR IMMEDIATE RECOVERY OF REPLICATED VIRTUAL MACHINES

(71) Applicant: EMC Corporation, Hopkinton, MA (US)

(72) Inventors: James J. Moore, Los Angeles, CA (US); Sorin Faibish, Newton, MA (US); Assaf Natanzon, Tel Aviv (IL)

(73) Assignee: EMC IP Holding Company LLC, Hopkinton, MA (US)

(*) Notice: Subject to any disclaimer, the term of this patent is extended or adjusted under 35 U.S.C. 154(b) by 71 days.

(21) Appl. No.: 14/674,519

(22) Filed: Mar. 31, 2015

(51) Int. Cl.
*G06F 11/00* (2006.01)
*G06F 11/20* (2006.01)
*G06F 11/14* (2006.01)
*H04L 29/08* (2006.01)

(52) U.S. Cl.
CPC ........ *G06F 11/203* (2013.01); *G06F 11/1451* (2013.01); *H04L 67/1095* (2013.01); *G06F 2201/84* (2013.01)

(58) Field of Classification Search
CPC ............ G06F 11/2094; G06F 11/2092; G06F 11/1464; G06F 11/2058; G06F 11/2089; G06F 11/0709; G06F 11/1471; G06F 11/2069; G06F 2201/85; G06F 2201/84
See application file for complete search history.

(56) References Cited

U.S. PATENT DOCUMENTS

| | | | |
|---|---|---|---|
| 8,429,362 B1* | 4/2013 | Natanzon | G06F 11/1471 711/161 |
| 9,081,754 B1* | 7/2015 | Natanzon | G06F 11/2058 |
| 9,081,842 B1* | 7/2015 | Natanzon | G06F 17/30578 |
| 9,201,736 B1* | 12/2015 | Moore | G06F 11/142 |
| 9,244,997 B1* | 1/2016 | Natanzon | G06F 17/30578 |
| 9,298,790 B2* | 3/2016 | Susanto | G06F 17/30575 |
| 2013/0007506 A1* | 1/2013 | Jain | G06F 11/1484 714/4.12 |
| 2014/0207736 A1* | 7/2014 | Susanto | G06F 17/30575 707/634 |
| 2015/0046407 A1* | 2/2015 | Kalas | G06F 17/30082 707/691 |
| 2016/0077919 A1* | 3/2016 | Duggan | G06F 11/1446 714/15 |
| 2016/0224249 A1* | 8/2016 | Desai | G06F 3/065 |

* cited by examiner

*Primary Examiner* — Nadeem Iqbal
(74) *Attorney, Agent, or Firm* — Krishnendu Gupta

(57) ABSTRACT

Example embodiments of the present invention relate to a method and system for immediate recovery of replicated virtual machines. The method includes replicating a complex asset from a first site of a distributed information processing system to a second site of the distributed information processing system. The replicated complex asset the may be configured at a first time in an active operational state but in a disconnected communicative state at the second site of the distributed information processing system. At a second time, the replicated complex asset may be configured in a connected communicative state at the second site of the distributed information processing system to facilitate recovery at the second site from a failure in the complex asset at the first site.

17 Claims, 25 Drawing Sheets

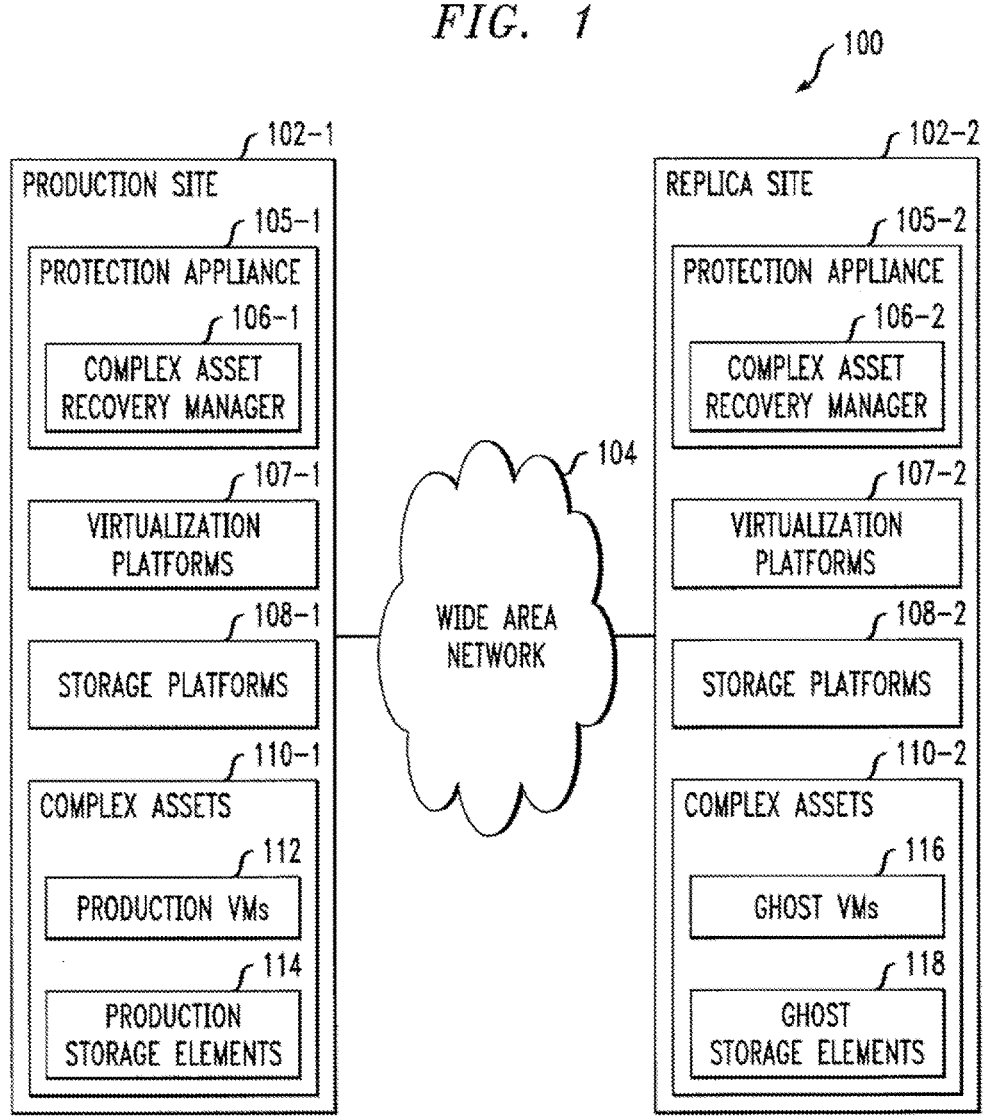

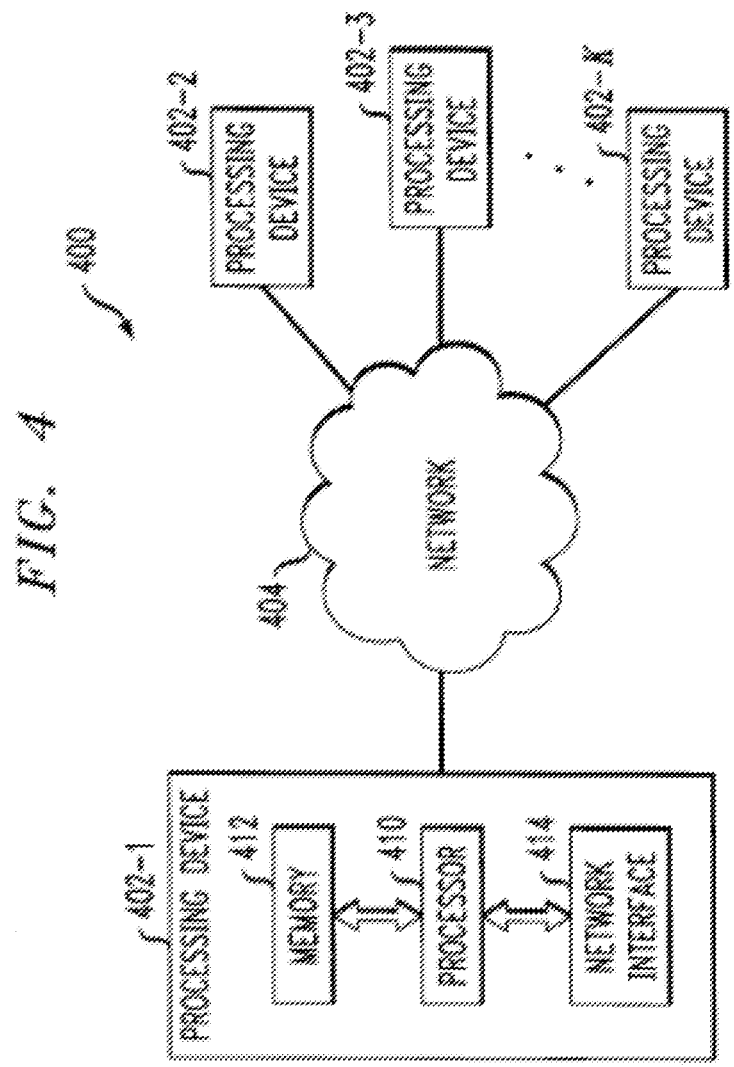

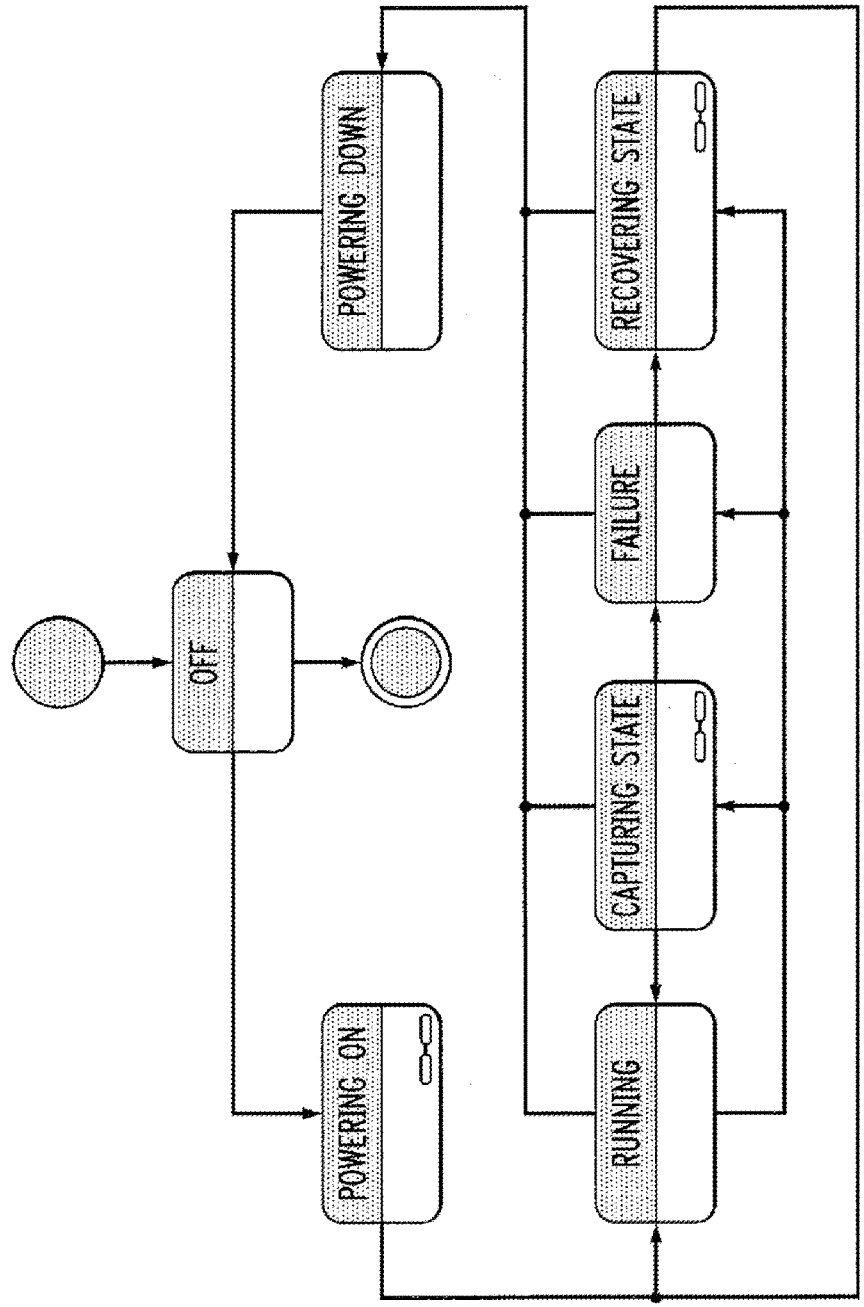

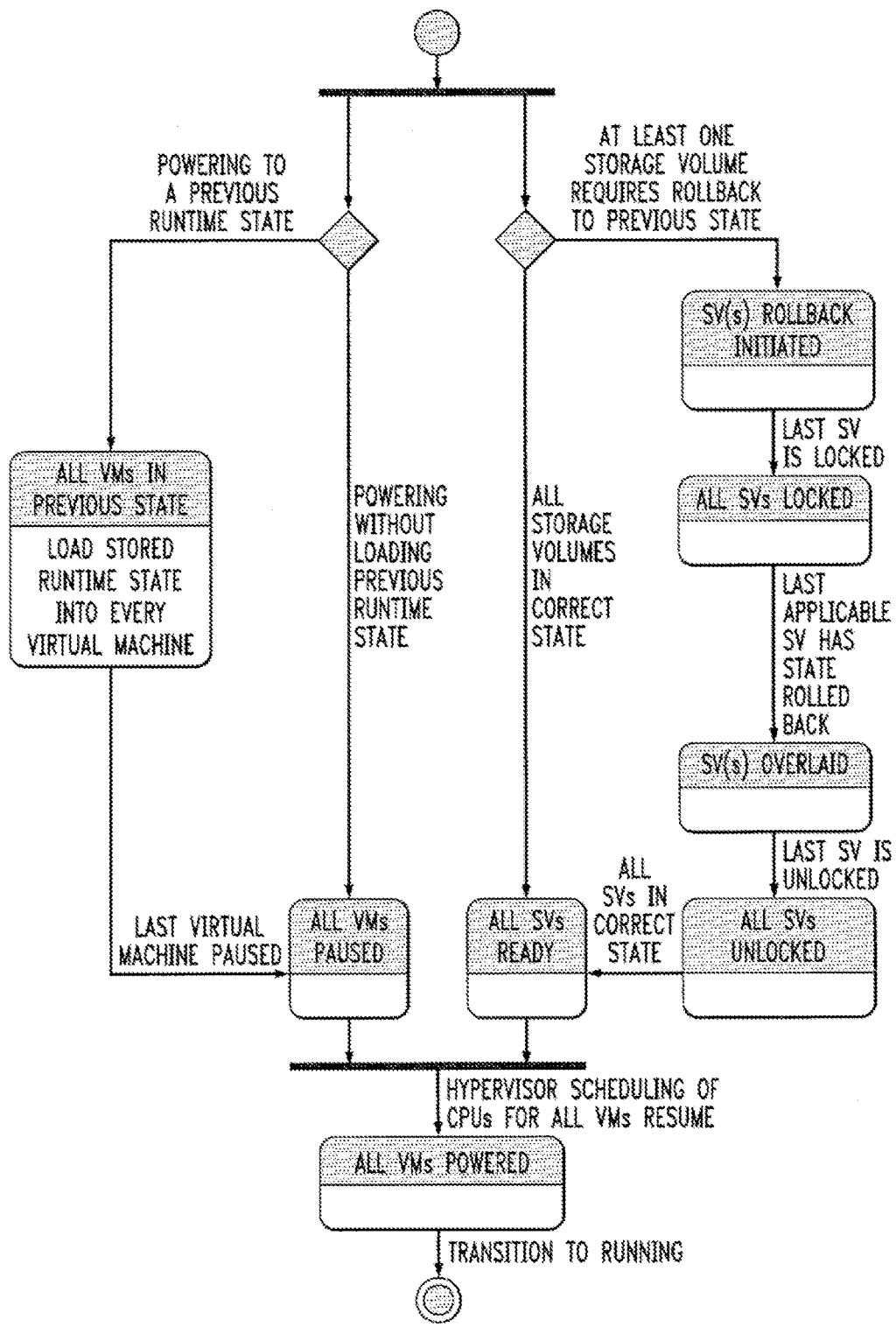

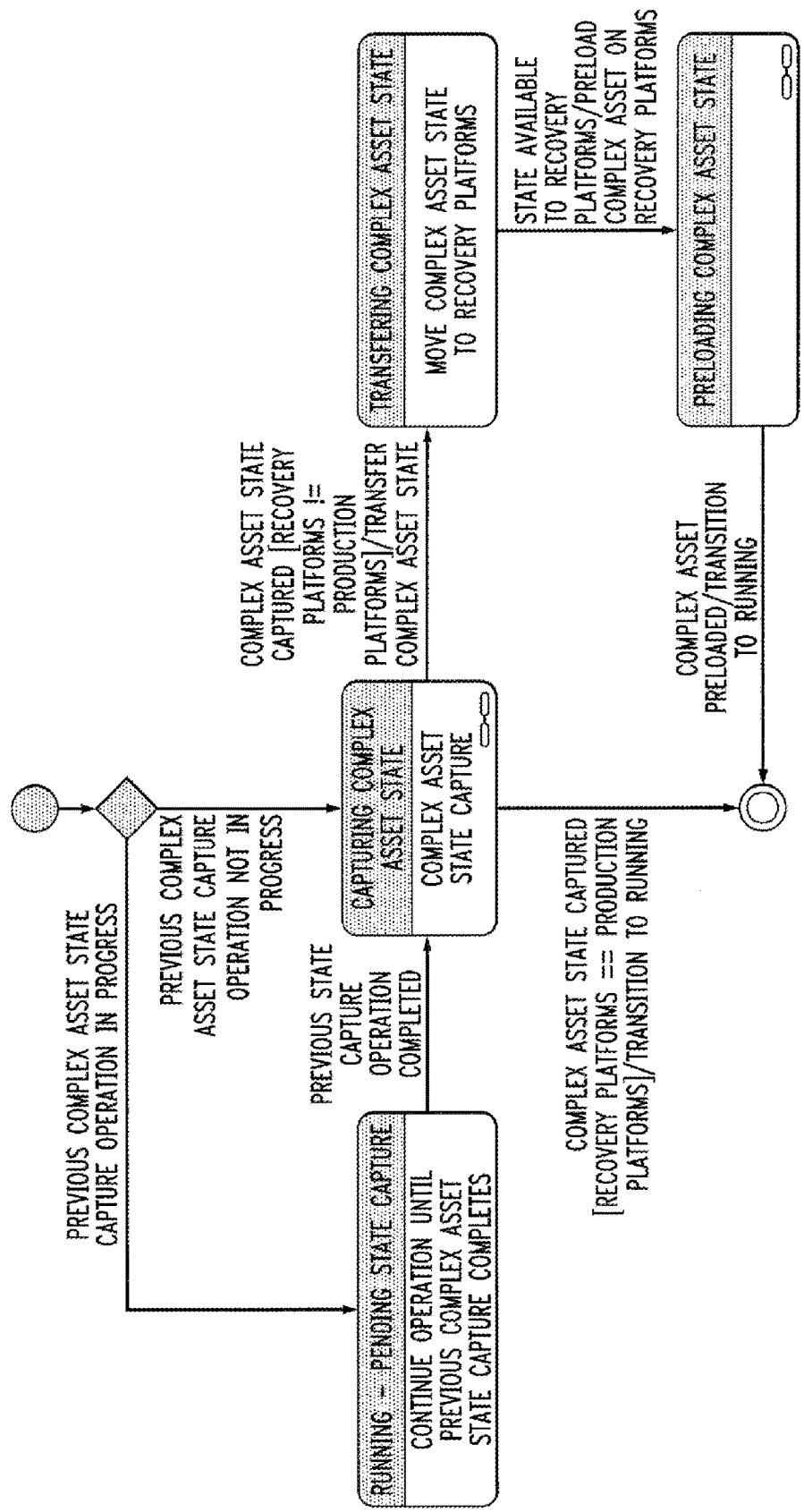

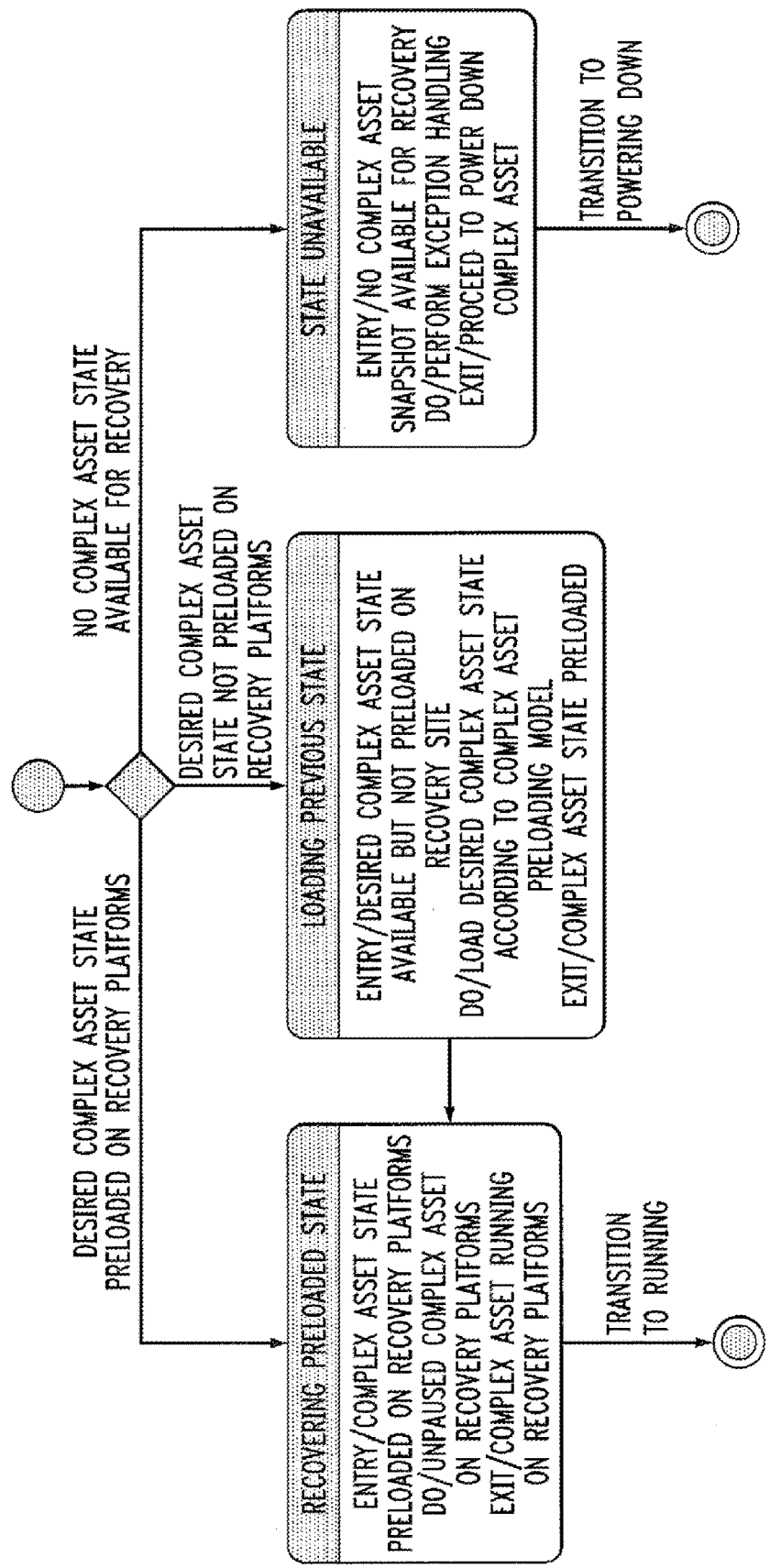

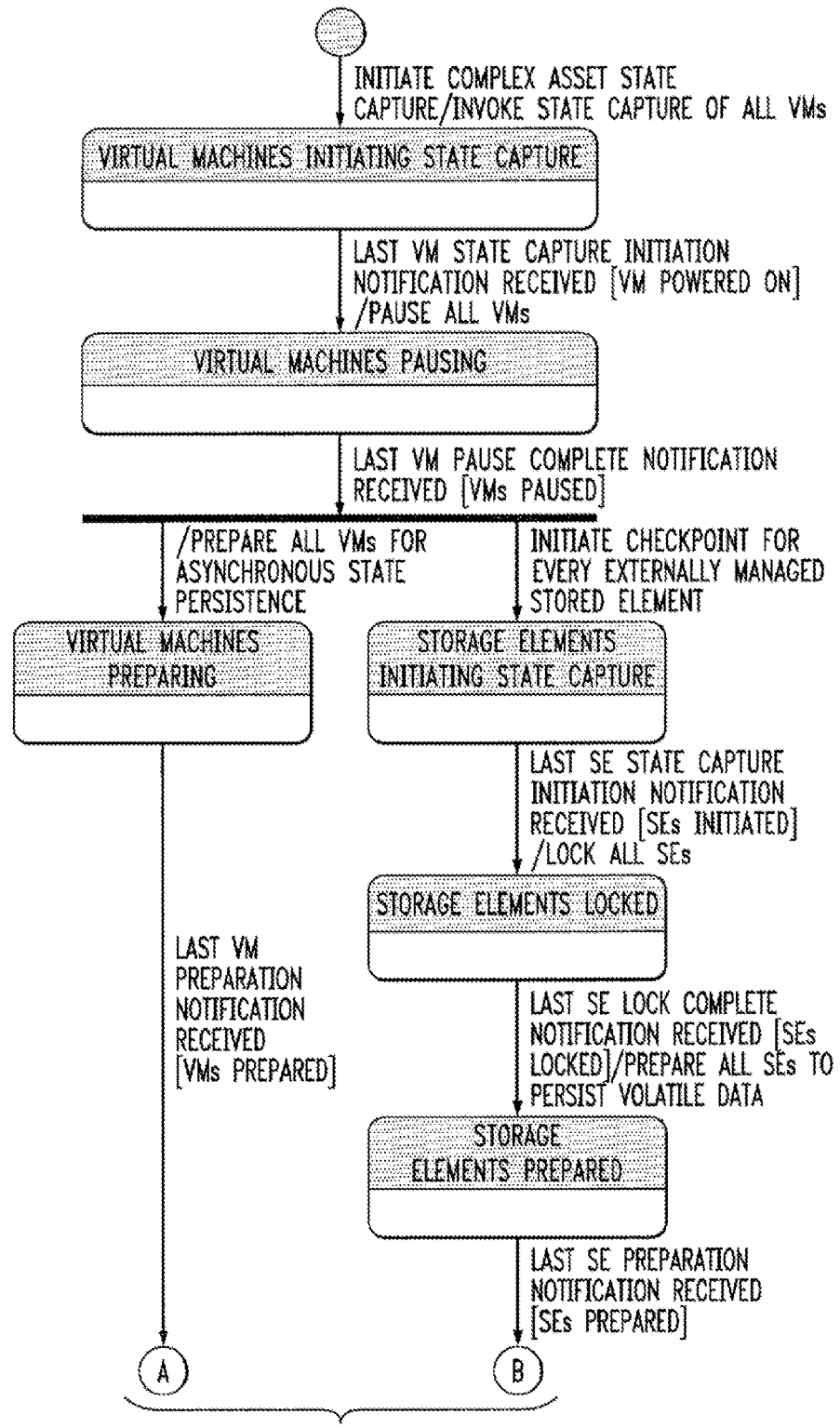

METHOD AND SYSTEM FOR IMMEDIATE RECOVERY OF REPLICATED VIRTUAL MACHINES

A portion of the disclosure of this patent document may contain command formats and other computer language listings, all of which are subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

CROSS REFERENCE TO RELATED APPLICATION

This Application is related to U.S. patent application Ser. Nos. 14/041,795 and 14/041,823 both entitled "METHODS AND APPARATUS FOR RECOVERY OF COMPLEX ASSETS IN DISTRIBUTED INFORMATION PROCESSING SYSTEMS" and filed on Sep. 30, 2013 the teachings of which applications are hereby incorporated herein by reference in their entirety.

TECHNICAL FIELD

The field relates generally to information processing, and more particularly to techniques for managing complex assets in a distributed information processing system comprising multiple sites.

BACKGROUND

Virtualization is being rapidly adopted across the information technology industry. Virtualization generally allows any number of virtual machines to run on a single physical machine, with each virtual machine sharing the resources of that one physical machine. Different virtual machines can run different operating systems and multiple applications on the same physical computer. Virtualization may be implemented by inserting a layer of software directly on the computer hardware in order to provide a virtual machine monitor or "hypervisor" that allocates hardware resources of the physical computer dynamically and transparently. The hypervisor affords an ability for multiple operating systems to run concurrently on a single physical computer and share hardware resources with each other.

Commercially available virtualization software such as VMware® vSphere® may be used to build complex information processing systems distributed across hundreds of interconnected physical computers and storage devices, possibly at multiple sites that are geographically remote from one another. Such arrangements advantageously avoid the need to assign servers, storage devices or network bandwidth permanently to each application. Instead, the available hardware resources are dynamically allocated when and where they are needed. High priority applications can therefore be allocated the necessary resources without the expense of dedicated hardware used only at peak times.

As information technology infrastructure becomes more complex and more widely distributed over larger numbers of physical and virtual machines, coordinating the operation of multiple architectural components becomes increasingly important. For example, a need exists for techniques for configuring complex assets at multiple sites so as to facilitate recovery from a failure in a complex asset at one of the sites.

SUMMARY

Example embodiments of the present invention relate to a method and system for immediate recovery of replicated virtual machines. The method includes replicating a complex asset from a first site of a distributed information processing system to a second site of the distributed information processing system. The replicated complex asset the may be configured at a first time in an active operational state but in a disconnected communicative state at the second site of the distributed information processing system. At a second time, the replicated complex asset may be configured in a connected communicative state at the second site of the distributed information processing system to facilitate recovery at the second site from a failure in the complex asset at the first site.

BRIEF DESCRIPTION OF THE DRAWINGS

Objects, features, and advantages of embodiments disclosed herein may be better understood by referring to the following description in conjunction with the accompanying drawings. The drawings are not meant to limit the scope of the claims included herewith. For clarity, not every element may be labeled in every Figure. The drawings are not necessarily to scale, emphasis instead being placed upon illustrating embodiments, principles, and concepts. Thus, features and advantages of the present disclosure will become more apparent from the following detailed description of exemplary embodiments thereof taken in conjunction with the accompanying drawings in which:

FIG. 1 is a block diagram showing a distributed information processing system having complex asset recovery functionality in an illustrative embodiment of the invention;

FIG. 4 shows an exemplary processing platform utilized to implement at least a portion of the FIG. 1 system;

FIGS. 5-10 are state transition diagrams illustrating lifecycle of an exemplary complex asset;

DETAILED DESCRIPTION

Figure 2A:
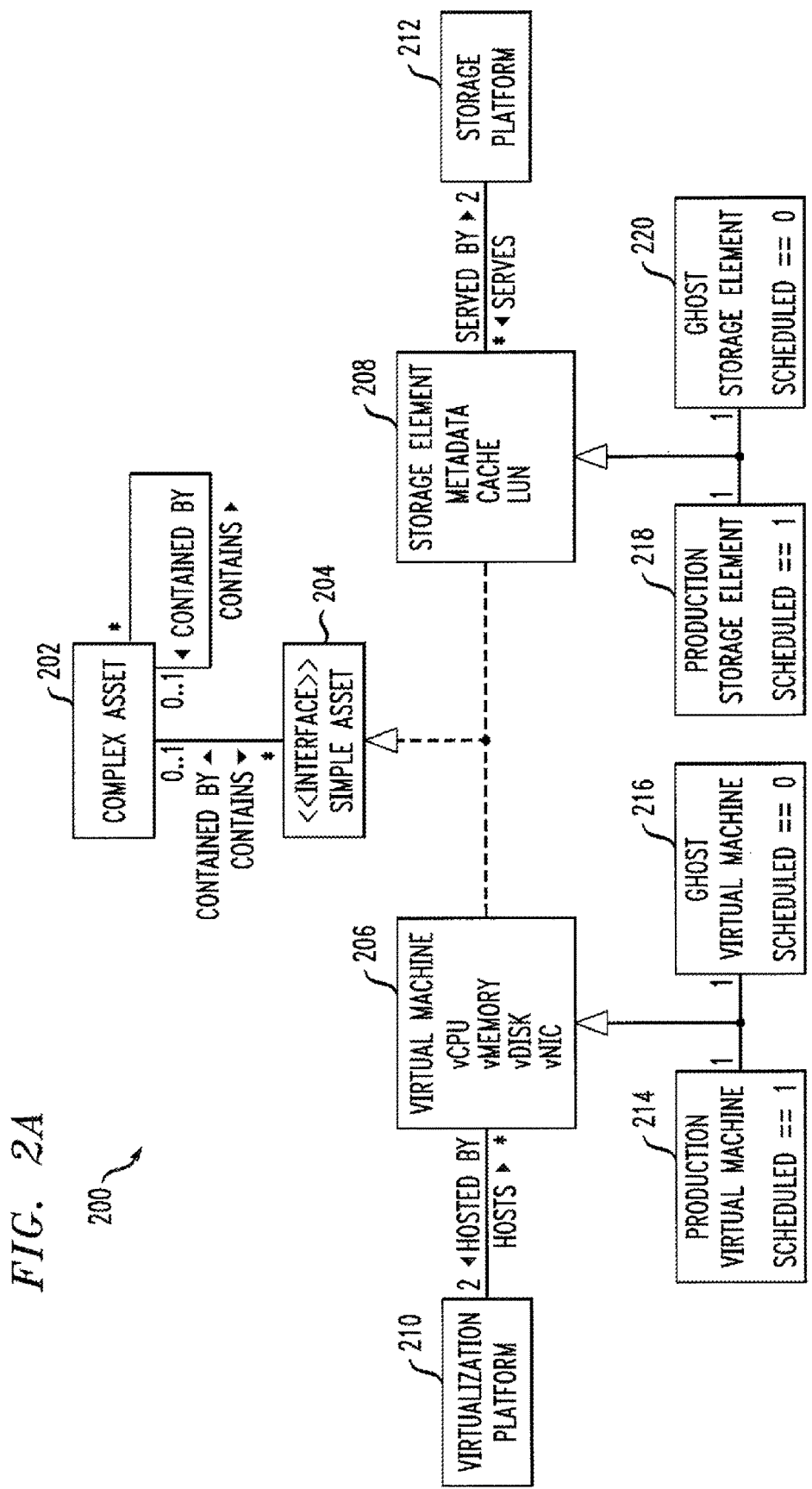
FIGS. 2A, 2B and 2C illustrate exemplary models of a complex asset in the FIG. 1 system.

The present invention will be described herein with reference to exemplary distributed information processing systems and associated production and replica sites, processing platforms and processing devices. It is to be appreciated, however, that the invention is not restricted to use with the particular illustrative system and device configurations shown. Moreover, the term "distributed information processing system" as used herein is intended to be broadly construed, so as to encompass, for example, multi-site data centers, private or public cloud computing systems, grid computing systems, computing clusters, high performance computer systems or storage systems, as well as other types of systems comprising distributed information technology infrastructure.

It should be noted that embodiments of the present invention may make use of one or more of the capture and/or revert techniques disclosed in U.S. patent application Ser. No. 13/077,213, filed Mar. 31, 2011 and entitled "Capture/Revert Module for Complex Assets of Distributed Information Technology Infrastructure," and/or one or more of the sync point coordination techniques disclosed in U.S. patent application Ser. No. 12/827,400, filed Jun. 30, 2010 and entitled "Sync Point Coordination Providing High Throughput Job Processing Across Distributed Virtual Infrastructure," which applications are commonly assigned herewith and incorporated by reference herein. However, use of such techniques is not a requirement of any embodiment of the present invention.

FIG. 1 shows a distributed information processing system 100 configured in accordance with an illustrative embodiment of the invention. The system 100 comprises a production site 102-1 that communicates with a replica site 102-2 over a network 104. The production and replica sites 102 are examples of what are more generally referred to herein as respective first and second sites of a distributed information processing system. Numerous other types and arrangements of multiple sites may be used in other embodiments, and such sites may be configured to implement similar functionality. For example, although site 102-1 is shown as a production site relative to replica site 102-2 in this embodiment, site 102-1 may additionally serve as a replica site relative to site 102-2 operating as a production site. In addition, a given one of the sites 102-1 or 102-2 may be configured to serve as a replica site for each of multiple production sites of a distributed information processing system.

The network 104 may comprise, for example, a global computer network such as the Internet, a wide area network (WAN), a local area network (LAN), a software defined network (SDN), a satellite network, a telephone or cable network, a cellular network, a wireless network such as WiFi or WiMAX, a network comprising virtual network switches, or various portions or combinations of these and other types of networks.

The sites 102-1 and 102-2 comprise respective protection appliances 105-1 and 105-2 implementing respective complex asset recovery managers 106-1 and 106-2. The protection appliances 105 are assumed in the present embodiment to be configured to support journaling functionality similar to that described in U.S. Pat. Nos. 7,516,287 and 7,627,612, both entitled "Methods and Apparatus for Optimal Journaling for Continuous Data Replication," which are commonly assigned herewith and incorporated by reference herein.

The complex asset recovery managers 106, although shown as elements of the protection appliances 105 in the present embodiment, may in other embodiments be implemented at least in part using an external controller, that is, a controller that is external to one or both of the sites 102. Such an external controller need not be part of any data recovery appliance, but may instead be part of a virtualization platform, a storage platform, a distributed resource management system, or another system component. Accordingly, the functionality associated with an external controller or other implementation of one or more complex asset recovery managers may be distributed over multiple system components, such that there is no single identifiable component providing all of the associated functionality.

The sites 102-1 and 102-2 further comprise respective virtualization platforms 107-1 and 107-2, each of which may comprise one or more hypervisors. An example of a commercially available virtualization platform that may be used in one or more embodiments of the invention is the VMware vSphere™ which may have an associated virtual infrastructure management system such as the VMware vCenter Server®. Other types of virtualization platforms that may be used include Microsoft® Hyper-V® Server.

The protection appliances 105 may be implemented at least in part using respective hypervisors of the virtualization platforms 107 of the production and replica sites. At least one of the protection appliances 105 may comprise a splitter configured to facilitate replication of a given portion of a complex asset at the replica site. In an example of an arrangement of this type, each of a plurality of hypervisors of the virtualization platform 107-1 provides one or more virtual machines that collectively run a particular application at the production site 102-1, and each of the hypervisors further comprises a separate splitter. The protection appliance 105-1 may also be implemented on one of these hypervisors.

The sites 102-1 and 102-2 also comprise respective storage platforms 108-1 and 108-2. These storage platforms may be implemented, for example, using storage products such as VNX® and Symmetrix® VMAX®, both commercially available from EMC Corporation of Hopkinton, Mass. A variety of other products may be utilized to implement at least a portion of the storage platforms 108. For example, storage platform functionality may be incorporated within a virtualization platform product.

It should be noted that at least portions of the complex asset recovery managers 106 may be implemented in other elements of the sites 102, such as in virtualization platforms 107 or storage platforms 108 of the sites.

Associated with the production site 102-1 are complex assets 110-1 that illustratively include production virtual machines (VMs) 112 and production storage elements 114. The replica site 102-2 comprises corresponding complex assets 110-2 that include ghost virtual machines 116 corresponding to respective ones of the production virtual machines 112 and ghost storage elements 118 corresponding to respective ones of the production storage elements 114. These virtual machines 116 and storage elements 118 are referred to as respective "ghost" elements prior to bringing at least a portion of them into a fully operational status in conjunction with recovery of a failure in one of the corresponding complex assets 110-1 of the production site 102-1.

As will be described in greater detail below, the protection appliances 105 and their associated complex asset recovery managers 106 are utilized in configuring the ghost virtual machines 116 and ghost storage elements 118 of the replica site in a manner that facilitates recovery from a failure in one of the complex assets 110-1 of the production site. The protection appliances 105 may each run on a computer, server or other processing platform element, which may be viewed as an example of what is more generally referred to herein as a "processing device."

FIG. 2A shows an exemplary model 200 of a complex asset 202 in system 100. A complex asset such as complex asset 202 illustratively comprises multiple simple assets 204 that have been logically assembled into a larger structure, where simple assets in the present embodiment generally comprise individual virtual machines or storage elements. In the diagram of FIG. 2A, the complex asset 202 is shown in Unified Modeling Language (UML) format and comprises multiple simple assets 204 including one or more virtual machines 206 and one or more storage elements 208.

A given virtual machine 206 may comprise, for example, elements such as virtual processor, virtual memory, virtual disk and virtual network interface card elements, respectively denoted in the figure as vCPU, vMemory, vDisk and vNIC elements. The given virtual machine 206 is hosted by virtualization platform 210, which is assumed to correspond to one of the virtualization platforms 107-1 or 107-2 of FIG. 1.

A given storage element 208 may comprise, for example, elements such as metadata storage, cache memory and logical units (LUNs). The given storage element 208 is served by storage platform 212, which is assumed to correspond to one of the storage platforms 108-1 or 108-2 of FIG. 1. Storage elements of a complex asset may be provided using any of a number of different types of storage devices, including, by way of example, storage devices associated with direct attached storage (DAS), storage area networks (SANs), network attached storage (NAS), or other types of storage technologies.

A given storage element can be associated with a virtual machine in many different ways. For example, one possibility is to surface a storage element through the hypervisor as a virtual disk (vDisk). This association can be made as: (1) a VMDK in a VMFS formatted data store, (2) a VMDK in an NFS formatted data store, and (3) a raw device map (RDM) of a LUN in virtual mode on a storage array. Another possibility is for the guest operating system to mount the storage element directly. For example through iSCSI, NFS, or a similar network enabled storage technology. In this case the storage element is outside the control and visibility of the virtualization platform.

In the event that virtual machines have multiple associated vDisks, it is possible that some vDisks are being replicated between sites while others are not. This could occur, for example when a virtual machine has one vDisk provided through remote SAN surfaced through the hypervisor, and a second vDisk provided by flash memory local to a hypervisor server as a virtual high-speed storage element. In this case the virtual high-speed storage element would be transported just as other virtual memory is transported. Accordingly, references herein to virtual hardware state are intended to comprise all virtual machine devices that are virtualized and are to be transported to the replica site.

As is apparent from the model 200, a given complex asset may be configured so as to comprise one or more virtual machines provided by one or more hypervisors of a virtualization platform, and at least one storage element provided by a storage platform. Accordingly, a complex asset may comprise multiple virtual machines and one or more associated external storage volumes that may or may not be visible to or controllable by a corresponding virtual machine hypervisor.

It should be noted that the term "storage element" as used herein is intended to be broadly construed so as to encompass a virtual disk provided by a virtualization platform, as well as a storage element provided by a storage platform but in a manner not visible to any hypervisor of the virtualization platform.

The multiple virtual machines associated with a given complex asset may comprise a set of virtual machines that are running a single application together. Numerous other arrangements of virtual machines and associated storage elements may be used in a complex asset as that term is broadly used herein.

The complex asset model 200 of FIG. 2A further associates virtual machine 206 with a production virtual machine 214 and a ghost virtual machine 216, each having a scheduled status as indicated. Similarly, storage element 208 is associated with a production storage element 218 and a ghost storage element 220. In the diagram, the production virtual machine 214 and production storage element 218 have a scheduled status of "1" and the ghost virtual machine 216 and the ghost storage element 220 have a scheduled status of "0." This indicates that the complex asset is scheduled at the production site but not scheduled at the replica site. In the event of failure in the complex asset at the production site, the complex asset is recovered at the replica site and the associated scheduled statuses are reversed.

It is also to be appreciated that the complex asset 202 as illustrated in FIG. 2A is merely an example, and numerous other types of complex assets may be subject to complex asset recovery using the techniques of the present invention.

Figure 2B:
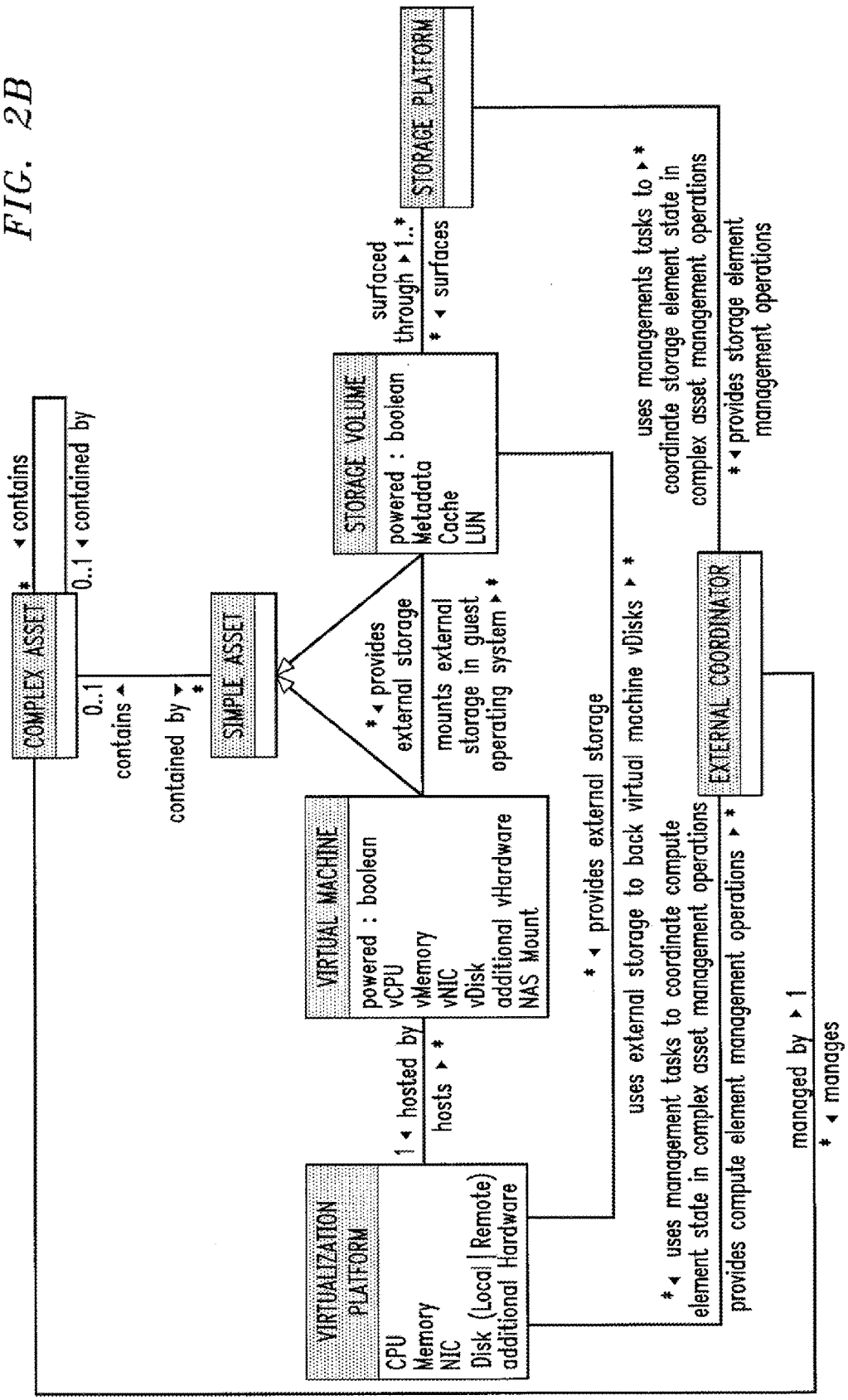
Figure 2C:
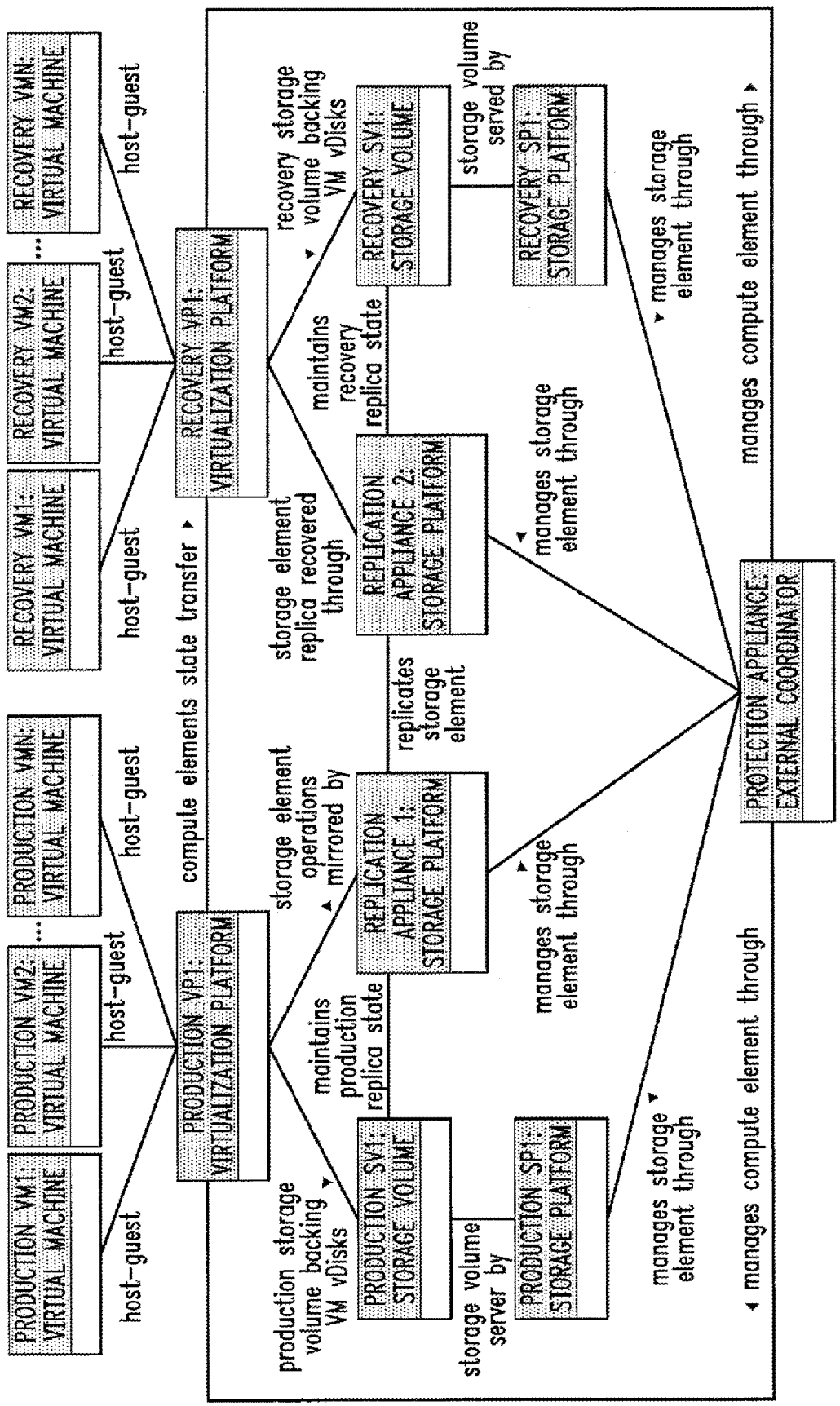

FIGS. 2B and 2C collectively illustrate another exemplary complex asset model, showing interaction with an external coordinator, which may illustratively comprise at least one of the complex asset recovery managers 105.

Additional details regarding exemplary complex assets that may be utilized in embodiments of the present invention are disclosed in the above-cited U.S. patent application Ser. No. 13/077,213.

The operation of the distributed information processing system 100 in recovering a given complex asset will now be described with reference to FIGS. 3A and 3B. For purposes of describing these exemplary processes, it will be assumed without limitation that a given complex asset comprises a first "portion" and a second "portion" although it is to be appreciated that it is a single complex asset of the type previously described in conjunction with one or more of FIGS. 2A, 2B and 2C that is referred to in this portion of the description.

More particularly, in the context of this illustrative embodiment, it is assumed that the first portion of the complex asset comprises virtual hardware elements including but not limited to sets of virtual processor, virtual memory and virtual network interface elements of respective ones of a plurality of virtual machines provided by a virtualization platform, and that the second portion of the complex asset comprises at least one storage element surfaced through a storage platform of the first site, with the storage platform being external to the virtualization platform. Accordingly, the complex asset illustratively includes at least one storage element provided by a storage platform external to the virtualization platform. The second portion may additionally include one or more storage elements provided by the virtualization platform, such that the second portion comprises multiple storage elements provided by the virtualization platform and the storage platform. For example, the second portion may comprise at least one of a first storage element comprising a virtual disk provided by the virtualization platform, and a second storage element provided by the storage platform. Again, these particular "portions" of a complex asset should be understood to be exemplary only, and simply refer to different sets of one or more components of a single complex asset.

As will become apparent, the complex asset is referred to as having these different first and second portions because such portions of the complex asset are handled differently in these exemplary processes associated with complex asset recovery in system 100. Thus, in the present embodiments, the first portion comprising the virtual hardware elements of respective ones of the virtual machines is subject to snapshot generation in the production site 102-1 and transfer of such snapshots from the production site to the replica site 102-2, while the second portion comprising the virtual disk provided by the virtualization platform or other storage element provided by the storage platform is subject to replication in the replica site.

Figure 3A:
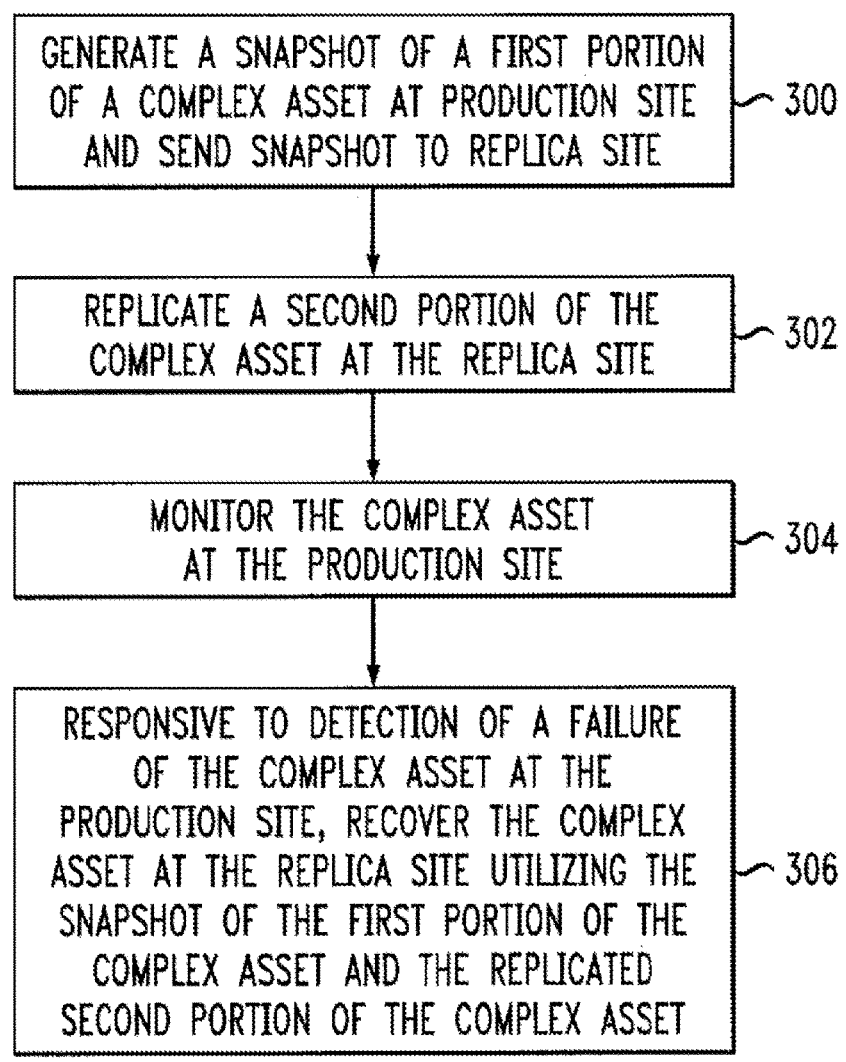
FIGS. 3A, 3B, and 3C are flow diagrams showing portions of an exemplary complex asset recovery process implemented in the FIG. 1 system.

Referring initially to FIG. 3A, the process as illustrated comprises steps 300 through 306, each of which will be described below.

In step 300, a snapshot of a first portion of a complex asset is generated at production site 102-1 and sent to the replica site 102-2. As mentioned above, this first portion of the complex asset illustratively includes sets of virtual processor, virtual memory and virtual network interface elements of respective ones of a plurality of virtual machines provided by virtualization platform 107-1. It should be noted that the snapshot generation may be configured such that an application running on the complex asset is not disrupted during the snapshot generation process.

In step 302, a second portion of the complex asset is replicated at the replica site 102-2. The snapshot of the first portion of the complex asset generated and sent in step 300 and the replicated second portion of the complex asset from step 302 are utilized at the replica site to preconfigure a ghost complex asset comprising one or more ghost virtual machines and one or more ghost storage elements in order to facilitate recovery at the replica site from a failure in the complex asset at the production site.

Although illustrated as serial steps in the figure, steps 300 and 302, as well as other steps of the process, may be performed in parallel with one another. It is important to recognize that these steps applied to respective first and second portions of a complex asset are not different serial processes, but are instead part of a unified process that takes a complex asset through multiple possible states. Examples of the states of a complex asset will be described in more detail below in conjunction with the state transition diagrams of FIGS. 5 through 10. Transitions between these states may be based on a progression of simple asset hosting platform management tasks and phases.

It is to be appreciated that different types of storage elements of the second portion of the complex asset may be replicated at the replica site 102-2 using different replication processes. For example, a replication process such as EMC RecoverPoint® from EMC Corporation may be used to provide replication between production and replica sites for storage elements surfaced through a hypervisor, and VNX Replicator from EMC Corporation may be used to provide replication between production and recovery sites for storage elements mounted directly by a guest OS outside the visibility of the hypervisor. These different types of storage elements are also referred to herein as hypervisor-controlled storage elements and externally-managed storage elements, respectively. Other types of replication processes may additionally or alternatively be used, such as VPLEX®, also commercially available from EMC Corporation.

It should be noted that terms such as "replicating" used herein should be construed broadly, and may comprise one or more actions taken by the production site to cause a replica to be generated at a replica site, one or more actions taken by the replica site in generating a replica, or combinations of actions collectively involving both the production site and the replica site.

In addition, the sending of the snapshot of a first portion of a complex asset to the replica site in step 300 and the replication of the second portion of the complex asset at the replica site in step 302 may be configured and executed responsive to an initial user approval of the replica site as a recovery site for the complex asset. Thus, a given implementation of steps 300 and 302 may first require that the user approve of a particular site to serve as the replica site for a particular complex asset of that user.

In some embodiments, the steps 300 and 302 may be performed asynchronously relative to one another, while in other embodiments generating the snapshot of the first portion of the complex asset in step 300 and replicating the second portion of the complex asset in step 302 are coordinated such that the replicating occurs in conjunction with pausing of the virtual machines to generate the snapshot. Thus, some embodiments may include coordination between the snapshot generation and the storage element replication such that, for example, replication may be taken from the exact same point-in-time at which virtual machines of the complex asset were paused to generate the snapshot.

Complex asset state information at the replica site may be updated as needed responsive to additional complex asset snapshots and replication information periodically received in the replica site from the production site. Accordingly, steps 300 and 302 may each be repeated periodically in order to maintain current complex asset state information in the replica site. This may involve periodically unloading complex asset state information at the replica site and loading newer complex asset state information.

In step 304, the complex asset at the production site is monitored. This monitoring is illustratively performed by at least one of the complex asset recovery managers 106, which as noted above may be implemented at least in part as an external controller relative to the production and replica sites.

In step 306, responsive to detection of a failure in the complex asset at the production site, the complex asset is recovered at the replica site utilizing the snapshot of the first portion of the complex asset and the replicated second portion of the complex asset. Thus, in this embodiment, recovery of the complex asset at the second site is triggered responsive to detection of a failure in the complex asset at the first site. Preloading of the ghost complex asset at the replica site allows this recovery to be achieved almost immediately upon detection of a failure, as described in more detail elsewhere herein.

The snapshot sent from the production site 102-1 to the replica site 102-2 in step 300 may be sent from protection appliance 105-1 to protection appliance 105-2.

Such functionality may involve utilization of journal processors implemented in respective ones of the complex asset recovery managers 106, with the journal processors being configured in a manner similar to that described in the above-cited U.S. Pat. Nos. 7,516,287 and 7,627,612. In the present embodiment, the journal processors may be more particularly configured to maintain respective recovery journals comprising complex asset state information at the respective production and replica sites. For example, the snapshot may be sent at least in part in metadata transmitted from the journal processor at the production site to the journal processor at the replica site, with the metadata comprising a complex asset bookmark including a pointer to one or more snapshot files.

The snapshot of the first portion of the complex asset may therefore be generated in a manner that allows recovery to a particular point-in-time based on selection of the point-in-time from a journal.

In the present embodiment, it is assumed that the snapshot generated and sent in step 300 comprises information characterizing memory state of the one or more virtual machines of the complex asset and does not include information charactering memory state of any complex asset storage element that is replicated at the replica site in step 302. Thus, there is no need to re-replicate in the snapshot the current state of complex asset storage elements such as virtual disk or other storage elements that are part of the complex asset but are provided by one or more storage platforms external to the virtualization platform.

A given snapshot generated by the production site may be erased at the production site after being sent to the replica site. This ability to erase snapshots advantageously ensures that maintenance of snapshots at the production site does not adversely impact storage performance at the production site.

Figure 3B:
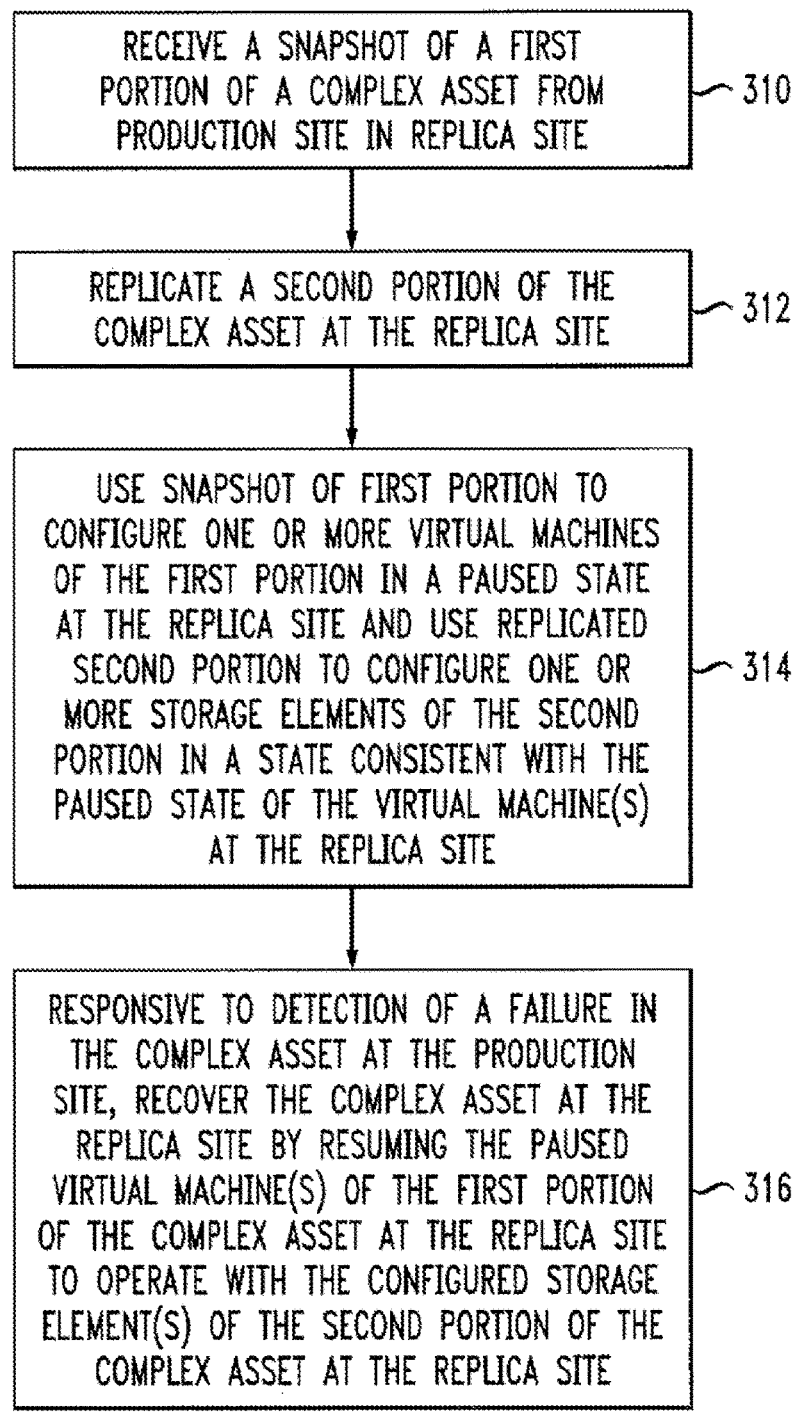

As illustrated in FIG. 3B, an exemplary process associated with complex asset recovery includes steps 310 through 316.

In step 310, the replica site 102-2 receives a snapshot of the first portion of a complex asset from the production site 102-1. The snapshot is generated in the manner previously described.

In step 312, the second portion of the complex asset is replicated at the replica site, also as previously described.

Again, although illustrated as serial steps in the figure, steps 310 and 312, as well as other steps of the process, may be performed in parallel with one another.

In step 314, the received snapshot of the first portion of the complex asset is used to configure one or more virtual machines of the complex asset in a paused state at the replica site. This may more particularly involve preloading a plurality of ghost virtual machines of a ghost complex asset at the replica site up to the paused state. Also, the replicated second portion of the complex asset is used to configure one or more storage elements of the second portion of the complex asset in a state consistent with the paused state of the one or more virtual machines of the first portion of the complex asset at the replica site. For example, the consistent state of the one or more replicated storage elements may correspond to a replicated point-in-time that corresponds to a capture time of the snapshot.

In step 316, the one or more paused virtual machines of the complex asset at the replica site are resumed responsive to detection of a failure in the complex asset at the production site. This may more particularly involve simultaneously resuming the plurality of ghost virtual machines of the ghost complex asset at the replica site. The one or more resumed virtual machines operate with the one or more configured storage elements so as to provide application consistent recovery of the complex asset.

Substantially continuous replication of the second portion of the complex asset may be provided at the second site in order to support rollback of the associated storage elements to any desired point-in-time.

In conjunction with preloading of the ghost virtual machines at the replica site, one or more ghost storage elements are also rolled back to a particular point-in-time, so as to be ready to resume from the point-in-time.

The pausing and resuming of virtual machines at the replica site in respective steps 314 and 316 in conjunction with rollback of the replicated storage elements allows substantially immediate recovery of the complex asset at the replica site based on current complex asset state information maintained at the replica site via the previously-described snapshot and replication mechanisms. The ghost virtual machines are brought up from the latest point-in-time which includes the full complex asset state.

In other embodiments, alternative mechanisms may be used to provide current complex asset state information to the replica site so as to support substantially immediate recovery responsive to a detected failure in the complex asset at the production site.

As indicated previously, the failure may be detected using one or more of the complex asset recovery managers 106, which may be implemented in the form of an external controller. Such an external controller may comprise a monitoring device that is external to both the production and replica sites. The monitoring device in some embodiments serves as an arbiter that monitors the complex asset at the production site and the corresponding ghost complex asset at the replica site, and upon determining that a failure has occurred in the complex asset at the production side triggers the resuming of the ghost virtual machines of the ghost complex asset at the replica site.

In recovering the complex asset, the replica site receives a recovery request from the external controller or another system element, rolls back one or more replicated storage elements of the complex asset at the replica site to a designated point-in-time, and schedules virtual processors of the one or more virtual machines of the complex asset at the replica site for operation utilizing the rolled back replicated storage elements.

Numerous other failure detection and recovery arrangements are possible in other embodiments. In some failure detection and recovery scenarios, only a subset of the virtual machines of the complex asset fail, although this is illustratively considered a failure of the entire complex asset. By way of example, if the complex asset is hosted using a given set of servers at one site, it may be restarted on a different set of servers at the same site, using snapshot generation and replication management techniques of a type similar to those disclosed herein for use across production and replica sites. Accordingly, embodiments of the present invention may be configured to perform failure detection and recovery at a single site of an information processing system.

Failure recovery at the second site in some embodiments may involve recovering network communication between ghost compute and ghost storage elements. For example, algorithms for network communication recovery to ensure lossless network communication between compute and storage elements may be involved in complex asset recovery on the second site. This is applicable to both physical networks and software defined networks.

Example embodiments of the present invention allow recovery of virtual machines with their memory (i.e., a full application without losing internal connectivity of the application) by recovery the replication virtual machines at the replica site. Such replication, for example, has a large impact on high performance computing where distributed applications can run calculations for weeks and for which a failure of one node can require a restart of the calculation.

Storage currently tends to be provisioned according to a gold, silver and bronze type of model that forces a virtualization administrator to pick the storage tier that most closely matches their needs. In example embodiments of the present invention, virtual volumes (vVols) match the requirements of a virtual machine (VM) to the underlying storage. In other words, storage can be provisioned dynamically according to the needs of the VM. In certain embodiments, vVol creation can even be tied to application provisioning.

In a preferred embodiment, to use vVOLs, a dialogue occurs between the storage hardware and the storage consumer (i.e., the VM). As part of the dialogue, the VM may send a request to the storage hardware, which will either accommodate the request or provide an alternative. In short, in certain embodiments, vVols may act as storage containers that align with individual VMs, with the container including a data store, a set of data services, and metadata.

Accordingly, example embodiments of the present invention may leverage virtual volumes (vVols) and vVol snapshots to have at least one older version of the application running at the recovery site at any time in a ghost virtual machine. The at least one ghost virtual machine may be configured to have the same Internet protocol (IP) address and internal network connectivity as the original virtual machine at the production site but will be in a disconnected environment, for example, to prevent IP address conflict with the source virtual machine while it is not in a failure condition. Therefore, if the production environment fails, the replica site 102-2, such as via the protection appliance, may connect the ghost virtual machine at the replica site to the external network and the distributed system work may resume.

Figure 3C:
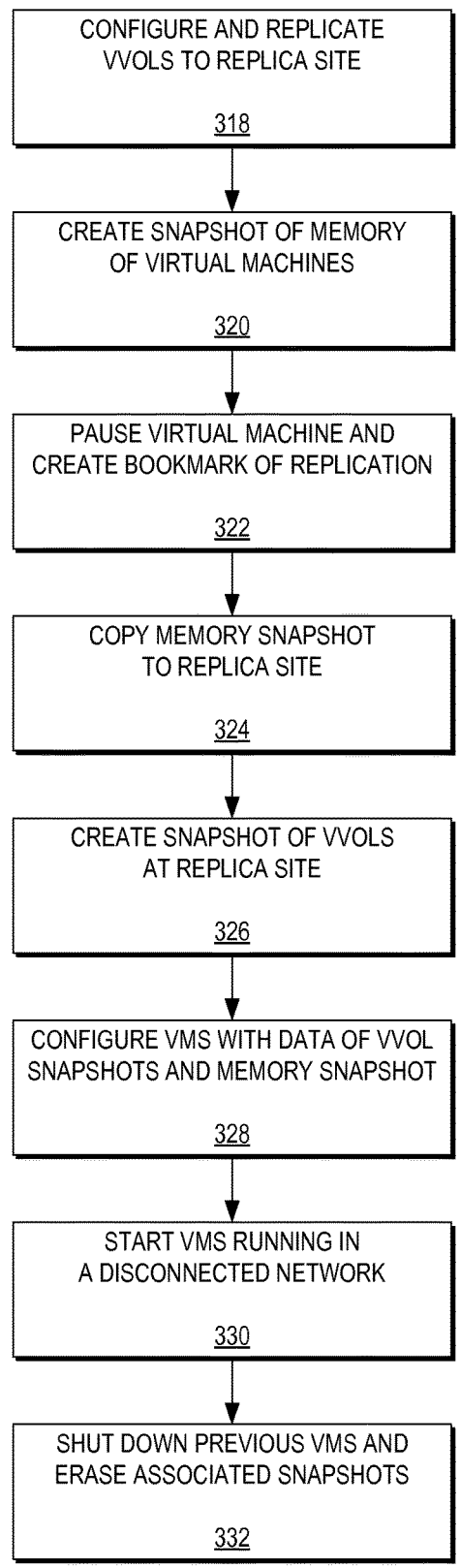

FIG. 3C is a flow diagram illustrating a method according to an example embodiment of the present invention. As illustrated in FIG. 3, and as described above with reference to FIGS. 3A and 3B, vVols for respective applications may be configured and replicated to the replica site (318). Periodically, a distributed snapshot of the memory of the virtual machines of the application may be created (320). It should be understood that, in certain embodiment, the hypervisor may pause the virtual machine in order to create the snapshot and, accordingly, at that time, the system may create a bookmark of the replication will be created the virtual machine will resume after bookmark is created (322), such as in a replication journal of a replication system (e.g., RecoverPoint). In certain embodiments, this resumption may be immediately after the bookmark is created to minimize latency or other delays.

The memory snapshot of the virtual machine then may be copied to the replica site (324) with a snapshot of the vVols being created at the replica site with a timestamp matching the virtual machines (326). Therefore, for example, in a replication environment running continuous data protection (CDP), example embodiments of the present invention have bookmarked application and data states captured at the same time thereby enabling application consistency by restoring the replicated virtual machine at the bookmarked time with the application's data state being reflected by applying journaled I/Os up to the bookmark.

When applying data from the replication environment at the replica site, according to an example embodiment of the present invention, a vVol snapshot may be created for the vVols at replica storage. Virtual machines with the data of the vVol snapshots and the memory snapshot then may be configured (328) to use the memory snapshot and the vVol at the point in time and started to be running in a disconnected network (330). It should be noted that replication continues throughout this process with new memory snapshots arriving at the replica site and new instances of the application running in new virtual machines at the replica site. Accordingly, the virtual machine running the first instance of the application may be shut down and the vVol snapshots may be erased (332) in favor of the new instance of the application running on the new virtual machine. It should be understood that there may be a short period of time where both instances of the application are running at the replica site before the first instance is shut down. When a failure is detected, the replica site may connect the latest virtual machine running the application to the external network thereby restoring the system immediately. With the same IP address used by the replica site ghost virtual machine as the production site virtual machine, clients connected to the distributed system will be unaware of the transition from the production site to the replica site.

It should be understood that there may be some data loss for data in flight between the production site and the replica site that cannot be captured at either the production site or replica site after the production site failure but before the replica site ghost virtual machine is connected to the external network. However, the inventors appreciate that the immediate recovery of applications in the event of a production site disaster may be beneficial in certain circumstances.

The particular processing operations and other system functionality described in conjunction with the flow diagrams of FIGS. 3A, 3B, and 3C are presented by way of illustrative example only, and should not be construed as limiting the scope of the invention in any way. Alternative embodiments can use other types of processing operations for recovering complex assets as disclosed herein. For example, the ordering of the process steps may be varied in other embodiments, or certain steps may be performed concurrently with one another rather than serially. Also, at least a subset of the process steps may be repeated periodically, possibly in accordance with an established schedule of snapshot generation and storage element replication as configured to facilitate complex asset recovery.

The distributed information processing system 100 is assumed to be implemented using multiple processing platforms. For example, each of the sites 102 may be implemented using a different set of one or more processing platforms.

An example of such a processing platform is processing platform 400 shown in FIG. 4. The processing platform 400 in this embodiment comprises a portion of the system 100 and includes a plurality of processing devices, denoted 402-1, 402-2, 402-3, . . . 402-K, which communicate with one another over a network 404. The network 404 may comprise any type of network, such as the Internet, a WAN, a LAN, a satellite network, a telephone or cable network, a cellular network, a wireless network such as WiFi or WiMAX, or various portions or combinations of these and other types of networks.

The processing device 402-1 in the processing platform 400 comprises a processor 410 coupled to a memory 412. The processor 410 may comprise a microprocessor, a microcontroller, an application-specific integrated circuit (ASIC), a field-programmable gate array (FPGA) or other type of processing circuitry, as well as portions or combinations of such circuitry elements, and the memory 412, which may be viewed as an example of a "processor-readable storage medium" having executable computer program code or other software programs embodied therein, may comprise random access memory (RAM), read-only memory (ROM) or other types of memory, in any combination.

Articles of manufacture comprising such processor-readable storage media are considered embodiments of the present invention. A given such article of manufacture may comprise, for example, a storage device such as a storage disk, a storage array or an integrated circuit containing memory. The term "article of manufacture" as used herein should be understood to exclude transitory, propagating signals.

Also included in the processing device 402-1 is network interface circuitry 414, which is used to interface the processing device with the network 404 and other system components, and may comprise conventional transceivers.

The other processing devices 402 of the processing platform 400 are assumed to be configured in a manner similar to that shown for processing device 402-1 in the figure. Again, the particular processing platform 400 shown in the figure is presented by way of example only, and system 100 may include additional or alternative processing platforms, as well as numerous distinct processing platforms in any combination, with each such platform comprising one or more computers, servers, storage devices or other processing devices.

Referring now to FIGS. 5 through 10, state diagrams are shown illustrating the lifetime of a complex asset in an illustrative embodiment. It should be understood that the states and associated transitions are exemplary only, and may be varied in other embodiments.

FIG. 5 shows the complete state diagram for complex asset life in the present embodiment. From an Off state, the complex asset can transition to a Powering On state. The Off state is entered from a Powering Down state. Additional states of the complex asset include Running, Capturing State, Failure and Recovering State.

FIGS. 6, 7 and 8 show more detailed views of Powering On, Capturing State and Recovering State, respectively.

Figure 16:
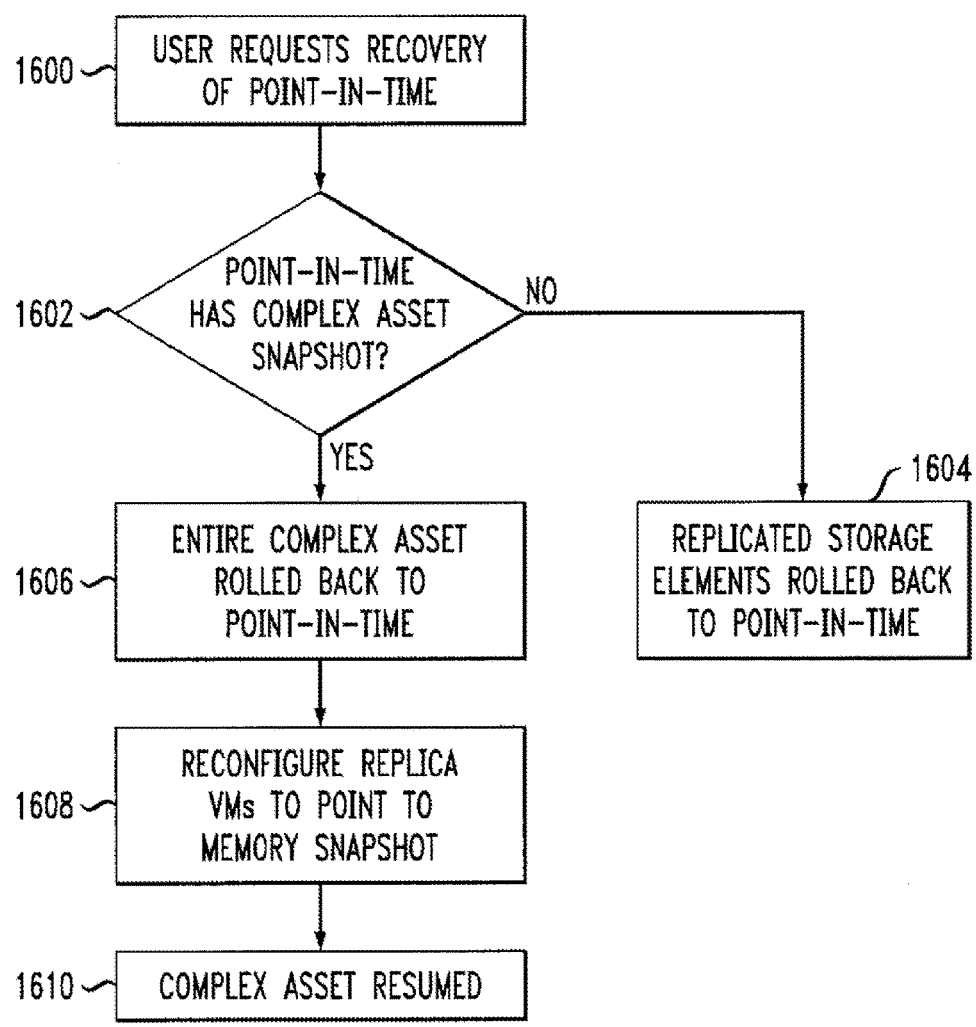

The Powering On diagram of FIG. 6 should be viewed in conjunction with FIG. 16. The left side of the state diagram of FIG. 6 illustrates recovery of the virtual machines of the complex asset from a paused state. At least a portion of the virtual machines are loaded with previous runtime state, while one or more of the virtual machines may be powered without loading previous runtime state, as indicated in the figure. The right side of the state diagram of FIG. 6 illustrates rollback of one or more storage volumes of the complex asset to a particular point-in-time. One or more of the storage volumes may already be in the correct state and therefore are not subject to rolling back.

The Capturing State diagram of FIG. 7 involves determining: (a) if state is currently being captured, (b) if target hosting platforms are the current hosting platforms, and (c) if state must be transferred and preloaded for failover. The process of failover preparation involves the complex asset transitioning between Capturing Complex Asset State, Transferring Complex Asset State, and Preloading Complex Asset State.

Figure 9:
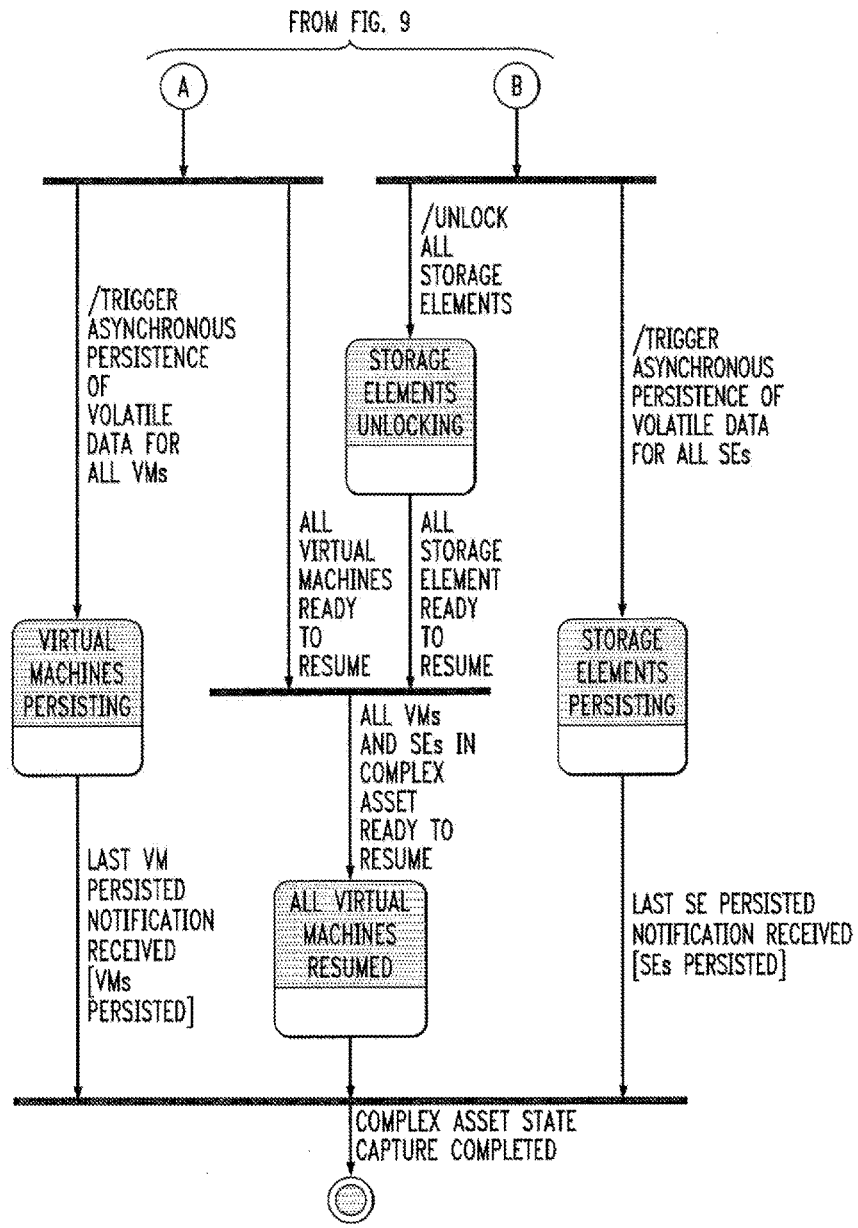

Capturing Complex Asset State, illustrated in detail in FIG. 9, provides capture functionality similar to that described in the above-cited U.S. patent application Ser. No. 13/077,213. FIG. 9 should be viewed in conjunction with FIG. 15. For example, step 1504 of FIG. 15 relates to persisting of storage elements in FIG. 9.

Figure 10:
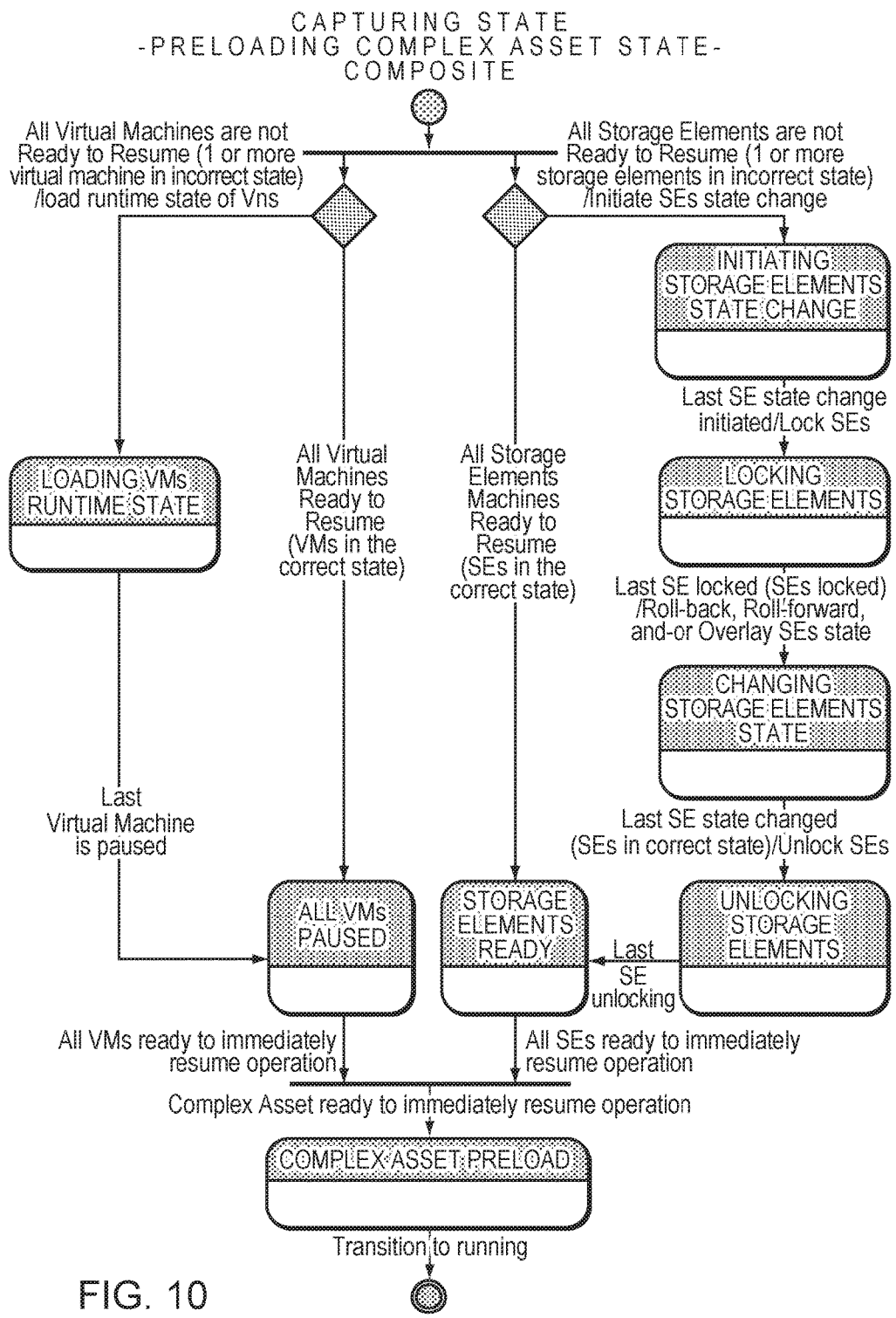
Figure 10:
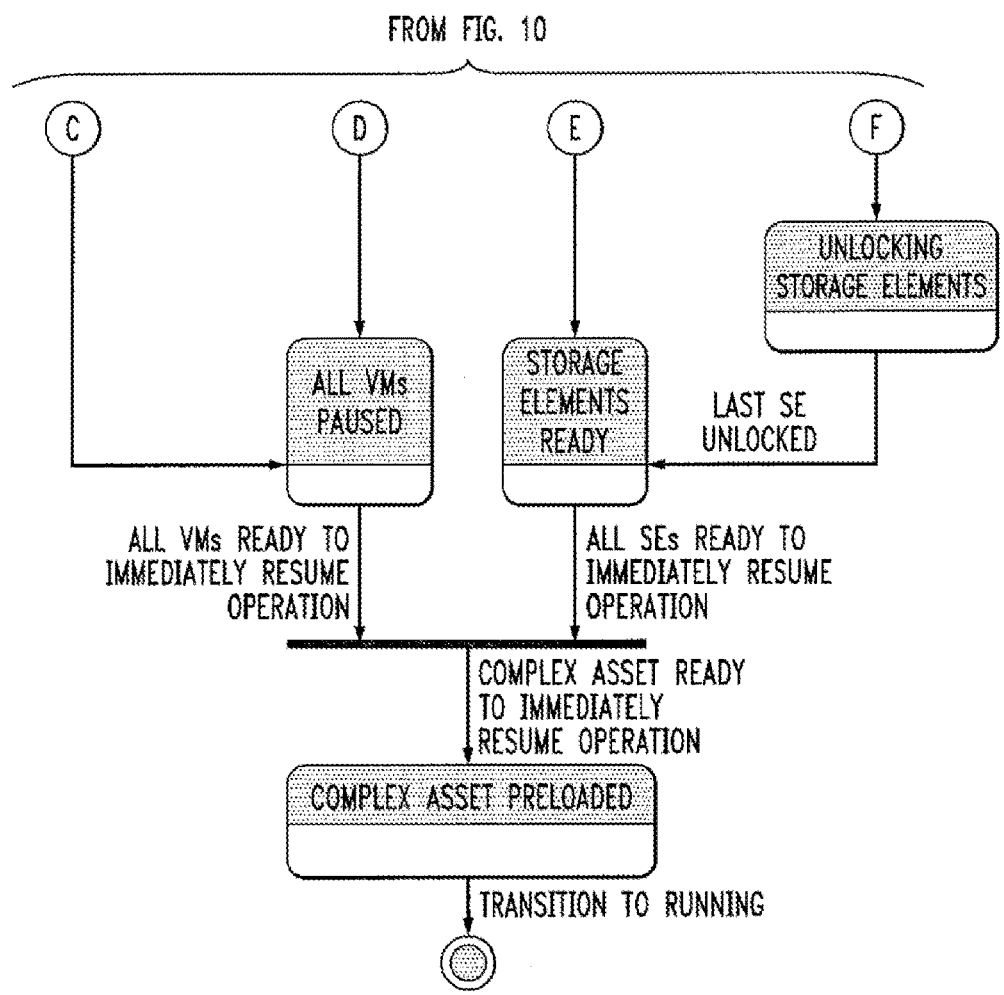

Preloading Complex Asset State, illustrated in detail in FIG. 10, provides revert functionality similar to that described in the above-cited U.S. patent application Ser. No. 13/077,213. However, in the case of preloading, a complex asset simply remains in an All VMs Paused state on the recovery hosts until a failure is encountered on the production hosting platforms. The above-noted external controller detects a failure and triggers the transition from All VMs Paused to an All VMs Powered On state. This transition may be viewed as substantially immediate, providing a substantially true-zero or pseudo-true-zero recovery time transition, as the ghost virtual machines are in a paused state ready for immediate scheduling on the virtualization platform, and the associated ghost storage elements are rolled back and ready to resume, in the manner previously described.

Figure 19:
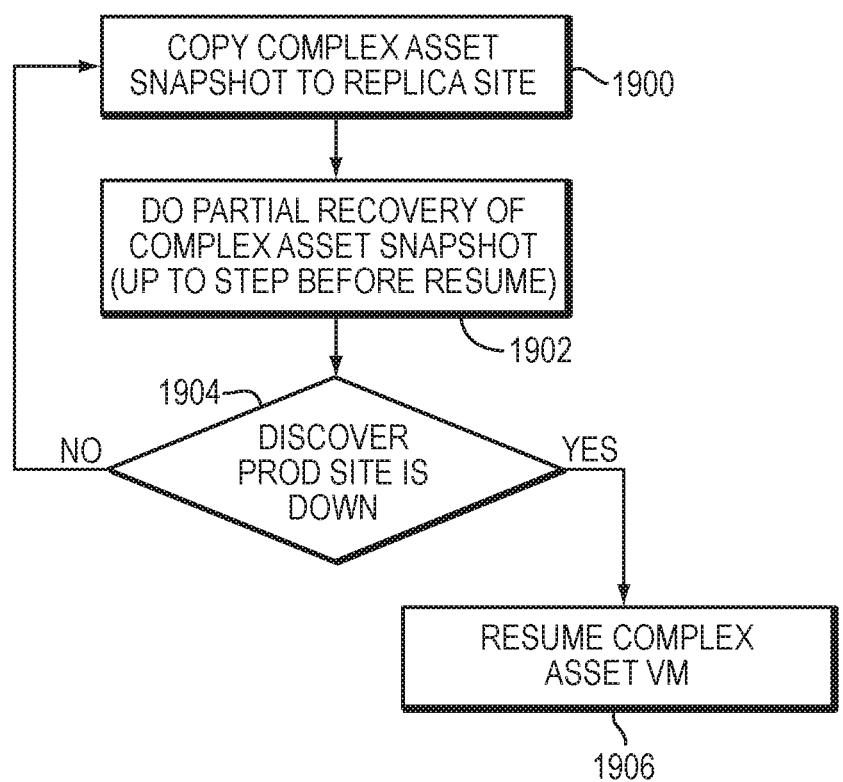

FIG. 10 generally illustrates the preloading of the ghost complex asset at the replica site and should be viewed in conjunction with FIG. 19.

From the Failure state of FIG. 5, the system is configured to detect the failure and trigger the recovery. Once the external controller determines a recovery is required, the transition from Failure to Recovering State involves determining if the simple assets are in the correct state on their hosting platforms, loading previous state into hosting platforms if required by transitioning into the Preloading Complex Asset State, and finally transitioning from All VMs Paused to All VMs Powered On.

Figure 11:
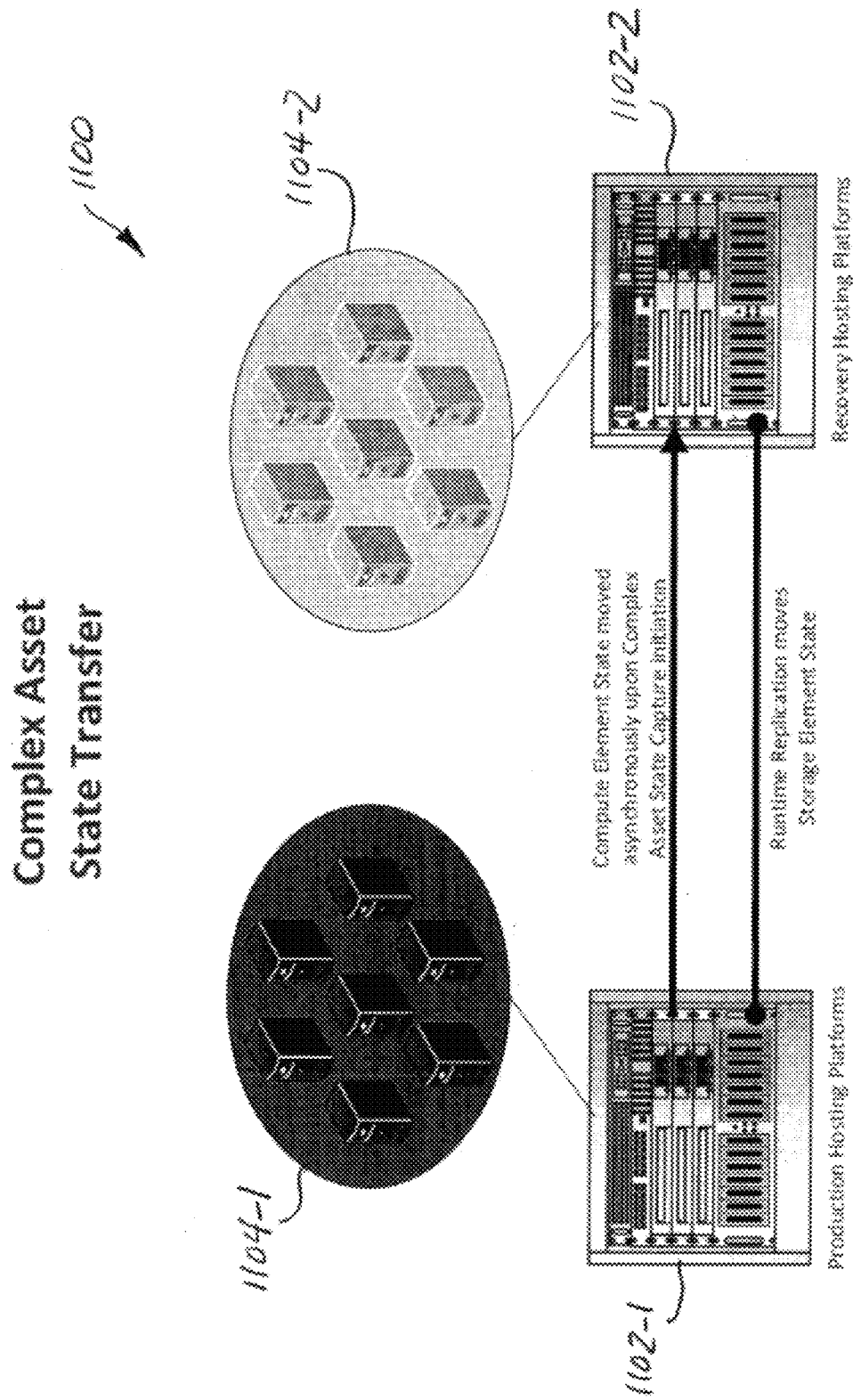
FIG. 11 is a diagram showing complex asset state transfer between production hosting platforms and recovery hosting platforms.

In the Transferring Complex Asset State of FIG. 5, captured state may be moved solely by the hosting platforms (e.g., virtualization and storage platforms) between the production and replica sites. An exemplary arrangement of this type is illustrated in FIG. 11, which shows a portion 1100 of system 100 including production hosting platforms 1102-1 and recovery hosting platforms 1102-2. The production hosting platforms 1102-1, which may correspond to portions of virtualization and storage platforms 107-1 and 108-1 of FIG. 1, comprise a set of processing devices 1104-1. Similarly, the recovery hosting platforms 1102-2, which may correspond to portions of virtualization and storage platforms 107-2 and 108-2 of FIG. 1, comprise a set of processing devices 1104-2. In this arrangement, compute element state associated with virtual hardware (e.g., vCPU, vMemory, vNIC) is moved asynchronously from the production hosting platforms 1102-1 to the recovery hosting platforms 1102-2, while runtime replication moves storage element state.

As one possible alternative, captured state may instead be moved by moving compute element state associated with virtual hardware such as vCPU, vMemory and vNIC between the production and replica sites, and associating a point-in-time state index with replicated storage elements between the production and replica sites. The point-in-time storage element state index may be taken in conjunction with Storage Elements Ready in Preloading Complex Asset State as illustrated in FIG. 10.

Again, the particular arrangements of states and associated transitions in the state diagrams of FIGS. 5 through 10 are exemplary only and a wide variety of alternative states and transitions may be used in other embodiments.

Another illustrative embodiment will now be described with reference to FIGS. 12-19. This embodiment may be viewed as a particular implementation of the distributed information processing system 100 previously described.

Figure 12:
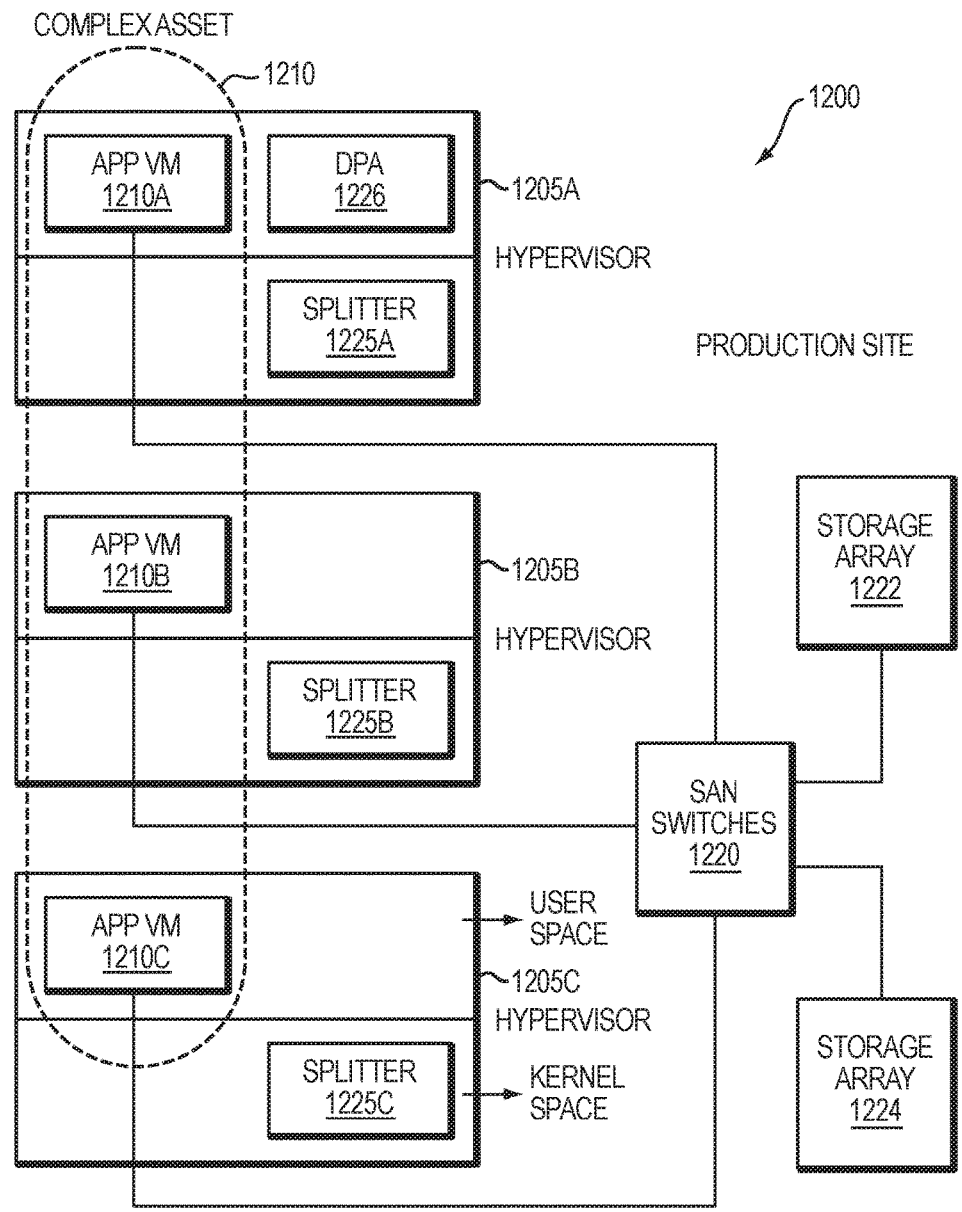
FIGS. 12-19 are block and flow diagrams illustrating the configuration and operation of an illustrative embodiment of the invention.

As illustrated in FIG. 12, a production site 1200 of the system in this embodiment comprises multiple hypervisors 1205A, 1205B and 1205C running respective application virtual machines (appVMs) 1210A, 1210B and 1210C of a complex asset 1210. The virtual machines are coupled via their respective hypervisors to SAN switches 1220 to storage arrays 1222 and 1224. The hypervisors include respective splitters 1225A, 1225B and 1225C with the splitters illustratively being arranged within a kernel space of their respective hypervisors, as opposed to a user space of the respective hypervisors. The first hypervisor 1205A is also running a virtual machine that executes code of a protection appliance 1226 of the type previously described herein.

Figure 13:
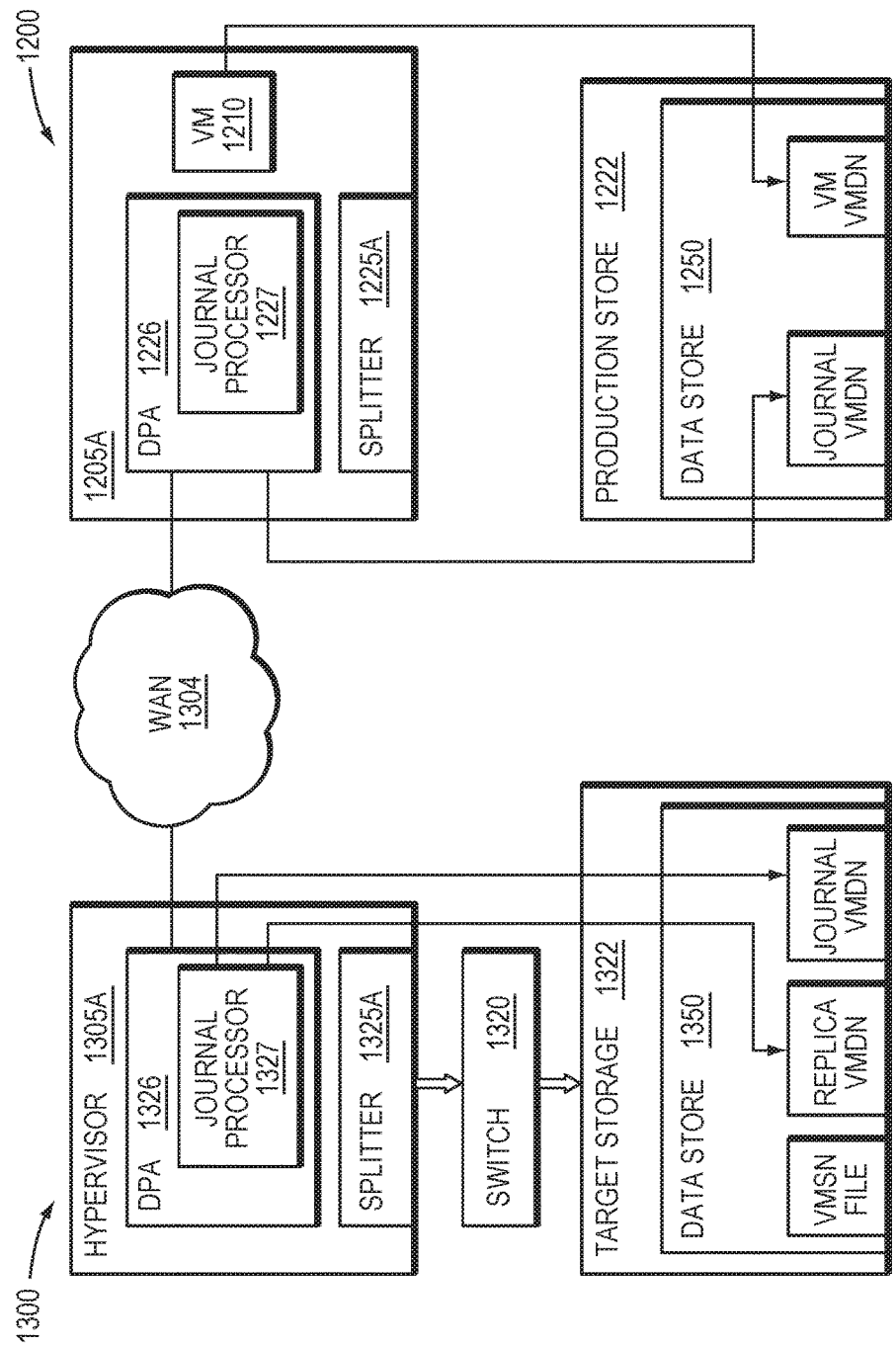

FIG. 13 illustrates replication in the system using production site 1200 coupled to replica site 1300 via WAN 1304. The protection appliance 1226 of the hypervisor 1205A at the production site 1200 comprises a journal processor 1227. The production site further comprises a data store 1250 implemented within production storage array 1222. The replica site 1300 includes hypervisor 1305A that is coupled via switch 1320 to a target storage array 1322. The hypervisor 1305A comprises splitter 1325A and protection appliance 1326. The protection appliance 1326 incorporates a journal processor 1327. The target storage array 1322 comprises a data store 1350.

Figure 14:
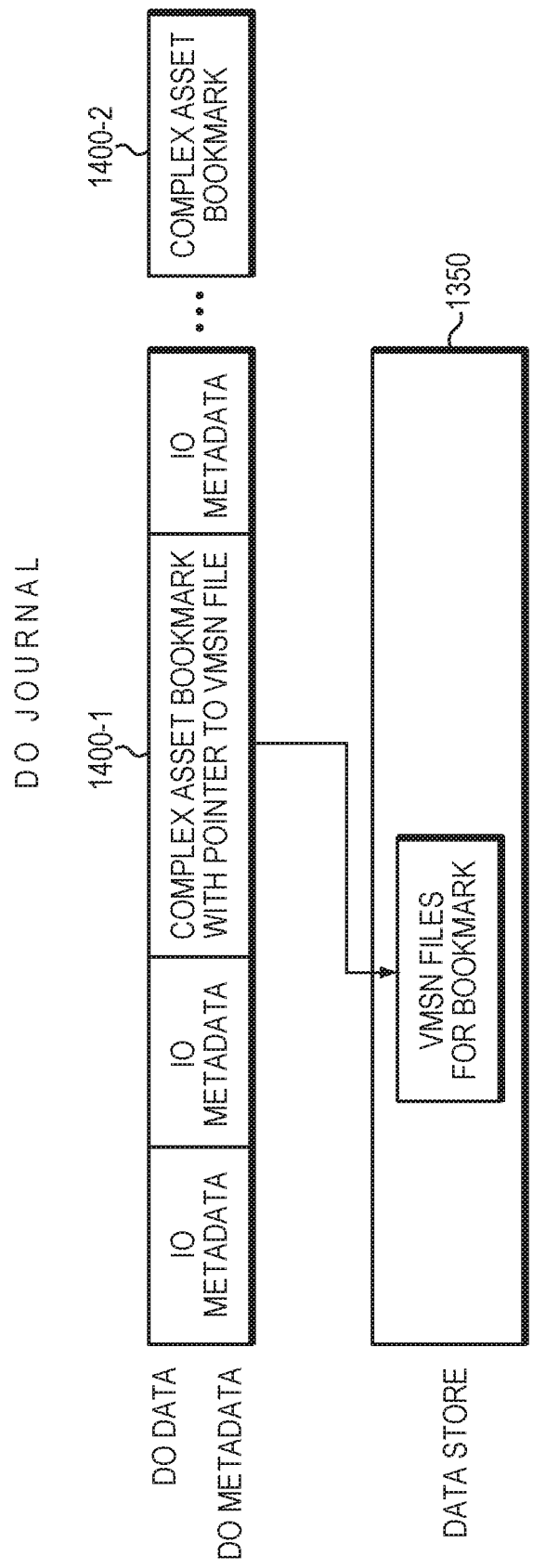

The data store 1250 of the production site 1200 comprises virtual disks of the virtual machine 1210 and associated journal files maintained for the virtual disks. These virtual disks are replicated in the data store 1350 of the replica site. The journal files contain change information configured to allow point-in-time recovery of the virtual disks. Also present in the data store 1350 are additional files, illustratively virtual machine snapshot (vmsn) files, which contain state information associated with a current snapshot provided by the production site to the replica site as previously described. FIG. 14 shows one possible configuration of a journal in the data store 1350 of the replica site 1300. The journal in this example comprises a DO journal similar to that described in the above-cited U.S. Pat. Nos. 7,516,287 and 7,627,612, but having DO metadata that is modified so as to include complex asset bookmarks 1400-1 and 1400-2 each comprising information illustratively including a pointer to a vmsn file and possibly other configuration files within the data store 1350.

In other embodiments, the vmsn file and other files containing complex asset state information may be stored within a journal volume rather than on a separate data store of the type shown in FIG. 13.

Figure 15:
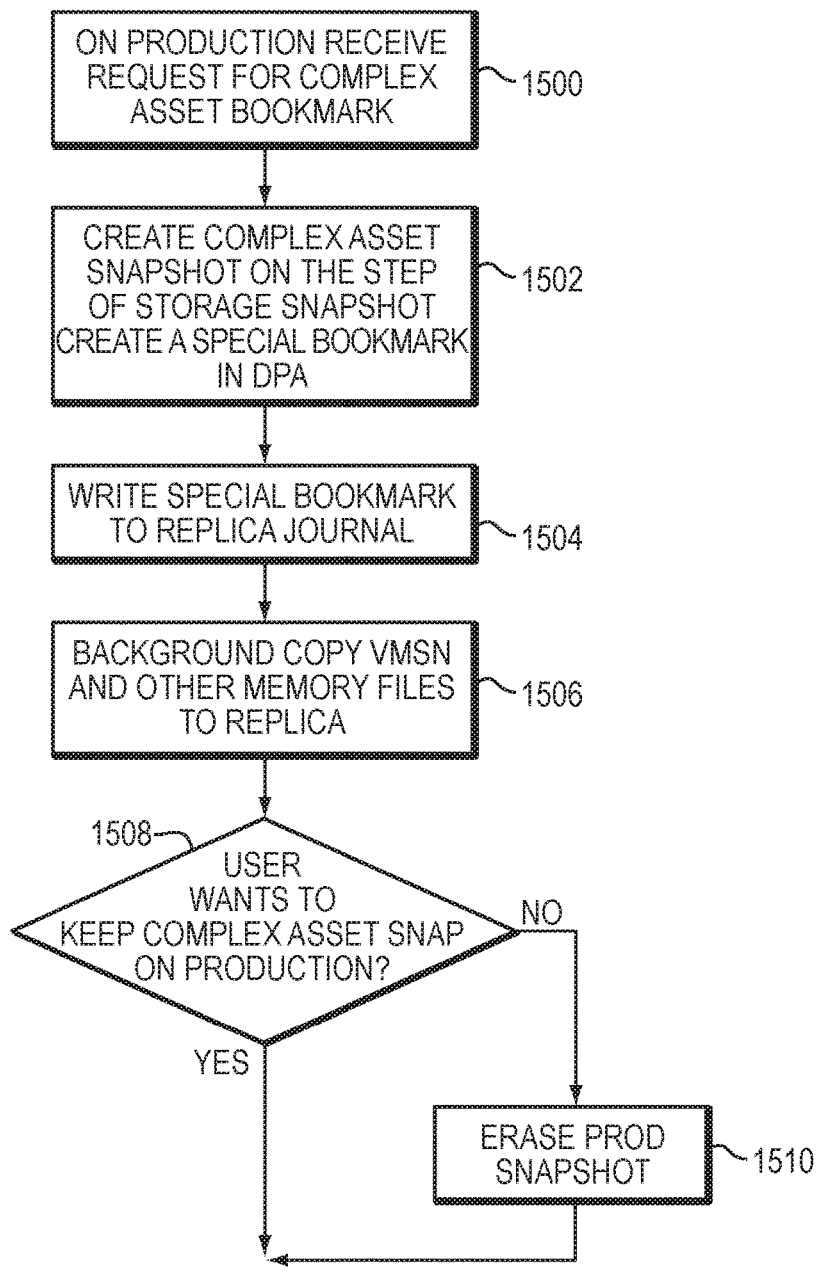

Referring now to FIG. 15, a process for the creation of a complex asset bookmark is illustrated. The process includes steps 1500 through 1508. This figure should be viewed in conjunction with the state diagram of FIG. 9.

In step 1500, the system receives a request to create a complex asset bookmark. This may be an automatic request generated in accordance with a specified periodic time configuration, or a user request.

In step 1502, the complex asset snapshot is created. This may involve use of capture techniques of the type described in the above-cited U.S. patent application Ser. No. 13/077,213, but modified such that upon capture of virtual machine state, a replication engine controlling capture of other storage element state is directed to create a bookmark. Such an arrangement provides coordination between capture of state for virtual machine elements and capture of state for other storage elements associated with the virtual machines in a given complex asset but not surfaced through the corresponding hypervisors. With reference to the state diagram of FIG. 9, the bookmark in this embodiment is created after storage elements are prepared.

In step 1504, the bookmark is written to the replica journal at the replica site.

In step 1506, a background process copies the rest of the complex asset state to the replica site. The bookmark points to the data at the replica site, which as indicated above may include the vmsn file indicating the current state of virtual machine hardware such as vCPU, vMemory and vNIC.

In step 1508, a determination is made as to whether or not the user wants to keep the complex asset snapshot at the production site. If not, the snapshot is erased at the production site as indicated in step 1510.

FIG. 16 shows a process for recovering a point-in-time ("pit") at the replica site using the complex asset snapshot and its associated bookmark. The process includes steps 1600 through 1610. This figure should be viewed in conjunction with the state diagram of FIG. 6.

In step 1600, the user requests recovery of a point-in-time for a complex asset.

In step 1602, a determination is made as to whether or not the requested point-in-time has a corresponding complex asset snapshot. If not, just the replicated storage elements are rolled back to the point-in-time in step 1604. Otherwise, the full complex asset state is available and the complex asset in its entirety is rolled back to the point-in-time as indicated in step 1606. This involves reconfiguring the replica site virtual machines in step 1608 in accordance with the appropriate snapshot utilizing the relevant vmsn files.

In step 1610, the complex asset is resumed. This involves resuming the paused virtual machines as previously described.

Figure 17:
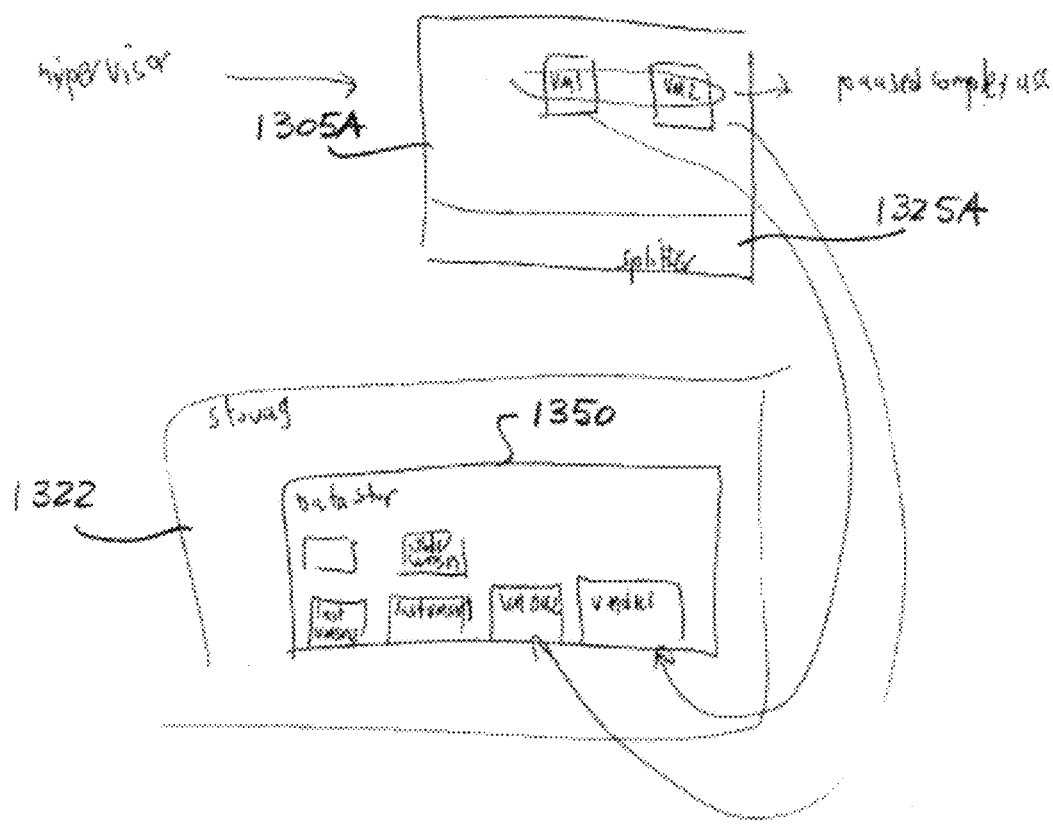

FIG. 17 shows a portion of the replica site 1300 including hypervisor 1305A and storage array 1322 with data store 1350. The complex asset at the replica site includes two virtual machines VM1 and VM2 that are almost up but in a paused state. These virtual machines include respective virtual disks VMDK1 and VMDK2 in the data store 1350 that are surfaced through the hypervisor 1305A. These are configured in accordance with replicated versions of these storage elements, indicated in the figure as "last" versions of VMDK1 and VMDK2, as well as other "older" versions.

Figure 18:
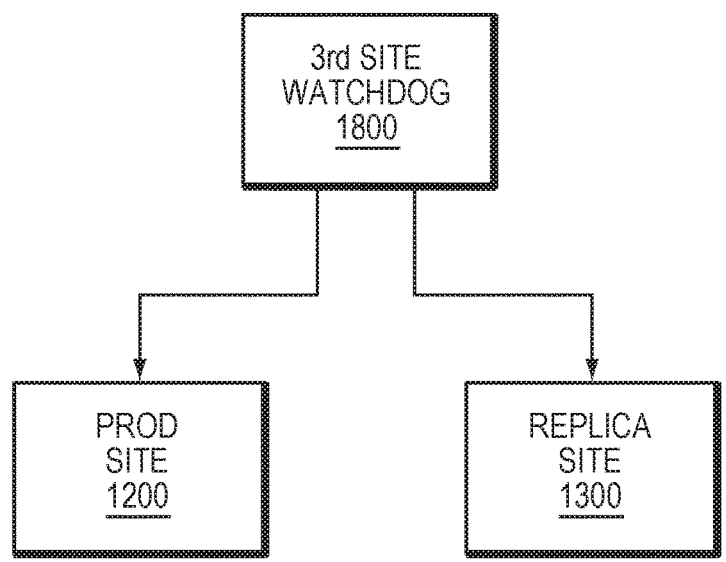

FIG. 18 shows one example of an external controller in the form of a third site watchdog process 1800 that monitors the production site 1200 and the replica site 1300 using check alive communications as indicated. When the watchdog process discovers that the production site is down or otherwise detects a failure in the complex asset at the production site, it will trigger generation of a resume command at the replica site and the paused virtual machines will resume running from the last complex asset state.

As mentioned previously, such an external controller may be implemented in the form of a monitoring device that runs externally to at least one of the production and replica sites. Alternatively, a similar controller may be implemented in one or both of the complex asset recovery managers 106 of FIG. 1.

Referring now to FIG. 19, a process for recovery of the complex asset upon detection of a failure is shown. The process includes steps 1900 through 1906.

In step 1900, a complex asset snapshot is copied to the replica site.

In step 1902, a partial recovery or preloading of the complex asset is performed, in accordance with the state diagram of FIG. 10, up to a step just before resume, such that the virtual machines are paused and ready to resume upon detection of a failure at the production site. This involves preloading the ghost complex asset with the latest complex asset state information. More particularly, the virtual machines at the replica site are preloaded based on the current complex asset snapshot, and the storage elements at the replica site are rolled back to a point-in-time indicated in the corresponding complex asset bookmark so that storage element state matches the virtual machine memory state. Accordingly, the complex asset at the replica site is armed and ready to be resumed responsive to an appropriate trigger at any time.

If a failure is detected in the complex asset at the production site in step 1904, the complex asset virtual machines at the replica site are resumed as indicated in step 1906.

It should be appreciated that the particular process steps and system configurations described in conjunction with FIGS. 12 through 19 are exemplary only, and that different arrangements may be used in other embodiments.

Illustrative embodiments of the invention can advantageously provide application consistent replication as well as substantially true-zero application recovery time in the event of complex asset failure.

It is also to be appreciated that complex asset recovery functionality such as that described above can be implemented at least in part in the form of one or more software programs stored in memory and executed by a processor of a processing device such as a computer or server. As indicated previously, a memory or other storage device having such program code embodied therein is an example of what is more generally referred to herein as a "machine-readable storage medium."

It should again be emphasized that the above-described embodiments of the invention are presented for purposes of illustration only. Many variations and other alternative embodiments may be used. For example, although described in the context of particular system and device configurations, the techniques are applicable to a wide variety of other types of information processing systems, processing devices and distributed arrangements of multiple sites. Also, alternative process steps and complex asset snapshot and replication techniques may be used to implement the complex asset recovery functionality. In addition, any simplifying assumptions made above in the course of describing the illustrative embodiments should also be viewed as exemplary rather than as requirements or limitations of the invention. Numerous other alternative embodiments within the scope of the appended claims will be readily apparent to those skilled in the art.

What is claimed is:

1. A method comprising:
   replicating a complex asset from a first site of a distributed information processing system to a second site of the distributed information processing system, wherein the replicating creates a first replica of the complex asset at the second site;
   configuring the replicated complex asset at a first time in an active operational state but in a disconnected communicative state at the second site of the distributed information processing system;
   configuring the replicated complex asset at a second time in a connected communicative state at the second site of the distributed information processing system to facilitate recovery at the second site from a failure in the complex asset at the first site;
   replicating a second replica of the complex asset from the first site of the distributed information processing system to the second site of the distributed information processing system, wherein the second replica of the complex asset includes: (i) a snapshot of a first portion of the second replica of the complex asset and (ii) a second portion of the second replica of the complex asset;
   configuring the second replicated complex asset at a third time in the active operational state but in the disconnected communicative state at the second site of the distributed information processing system; and
   recovering the second replica of the complex asset at the second site according to the snapshot of the first portion of the second replica of the complex asset and the second portion of the second replica of the complex asset.

2. The method of claim 1 further comprising:
   monitoring the complex asset at the first site; and
   triggering recovery of the second replica of the complex asset at the second site responsive to detection of a failure in the related complex asset at the first site.

3. The method of claim 2 further comprising:
   configuring the second replicated complex asset at a fourth time in the connected communicative state at the second site of the distributed information processing system; and
   disabling the first replicated complex asset at a fifth time.

4. The method of claim 1 wherein replicating a second replica of the complex asset comprises:
   generating the snapshot of the first portion of a second complex asset at the first site of the distributed information processing system, the second complex asset comprising one or more virtual machines provided by one or more hypervisors of a virtualization platform of the first site and at least one storage element surfaced through a storage platform of the first site external to the virtualization platform;
   sending the snapshot to the second site of the distributed information processing system; and
   replicating a second portion of the complex asset at the second site.

5. The method of claim 1 wherein configuring the second replicated complex asset at the third time in the active operational state but in the disconnected communicative state at the second site of the distributed information processing system comprises configuring a ghost complex asset comprising one or more ghost virtual machines and one or more ghost storage elements of the second site in order to facilitate recovery at the second site.

6. The method of claim 3 wherein disabling the first replicated complex asset at the fifth time comprises deleting the snapshot of the first portion of the complex asset sent to the second site.

7. The method of claim 4 wherein sending the snapshot to the second site comprises sending the snapshot from a protection appliance of the first site to a protection appliance of the second site, wherein the protection appliances comprise respective complex asset recovery managers including respective journal processors configured to maintain respective recovery journals comprising complex asset state information at the respective first and second sites.

8. The method of claim 7 wherein sending the snapshot comprises sending the snapshot at least in part in metadata transmitted from the journal processor at the first site to the journal processor at the second site wherein said metadata comprises a complex asset bookmark including a pointer to one or more snapshot files.

9. A distributed information processing system comprising:
   a first site;
   a second site;
   a processing platform comprising at least one processing device having a processor coupled to memory implementing a complex asset recovery manager configured to:
   replicate a complex asset from the first site of the distributed information processing system to the second site of the distributed information processing system, wherein the replication creates a first replica of the complex asset at the second site;
   configure the replicated complex asset at a first time in an active operational state but in a disconnected communicative state at the second site of the distributed information processing system;
   configure the replicated complex asset at a second time in a connected communicative state at the second site of the distributed information processing system to facilitate recovery at the second site from a failure in the complex asset at the first site
   replicate a second replica of the complex asset from the first site of the distributed information processing system to the second site of the distributed information processing system, wherein the second replica of the complex asset includes: (i) a snapshot of a first portion of the second replica of the complex asset and (ii) a second portion of the second replica of the complex asset;

configure the second replicated complex asset at a third time in the active operational state but in the disconnected communicative state at the second site of the distributed information processing system; and recover the second replica of the complex asset at the second site according to the snapshot of the first portion of the second replica of the complex asset and the second portion of the second replica of the complex asset.

10. The system of claim 9 wherein the processing platform is further configured to:

monitor the complex asset at the first site; and trigger recovery of the second replica of the complex asset at the second site responsive to detection of a failure in the related complex asset at the first site.

11. The system of claim 10 wherein the processing platform is further configured to:

configure the second replicated complex asset at a fourth time in the connected communicative state at the second site of the distributed information processing system; and disable the first replicated complex asset at a fifth time.

12. The system of claim 9 wherein the processing platform is further configured to:

generate the snapshot of the first portion of a second complex asset at the first site of the distributed information processing system, the second complex asset comprising one or more virtual machines provided by one or more hypervisors of a virtualization platform of the first site and at least one storage element surfaced through a storage platform of the first site external to the virtualization platform;

send the snapshot to the second site of the distributed information processing system; and replicate a second portion of the complex asset at the second site.

13. The system of claim 9, wherein the processing platform is further configured to configure a ghost complex asset comprising one or more ghost virtual machines and one or more ghost storage elements of the second site in order to facilitate recovery at the second site.

14. The system of claim 11 wherein the processing platform is further configured to delete the snapshot of the first portion of the complex asset sent to the second site.

15. The system of claim 9 wherein the processing platform is further configured to send the snapshot from a protection appliance of the first site to a protection appliance of the second site, wherein the protection appliances comprise respective complex asset recovery managers including respective journal processors configured to maintain respective recovery journals comprising complex asset state information at the respective first and second sites.

16. The system of claim 15 wherein the processing platform is further configured to send the snapshot at least in part in metadata transmitted from the journal processor at the first site to the journal processor at the second site wherein said metadata comprises a complex asset bookmark including a pointer to one or more snapshot files.

17. A computer program product including a nontransitory computer readable storage medium having computer program code encoded thereon comprising:

computer program code for replicating a complex asset from a first site of a distributed information processing system to a second site of a distributed information processing system, wherein the replicating creates a first replica of the complex asset at the second site;

computer program code for configuring the replicated complex asset at a first time in an active operational state but in a disconnected communicative state at the second site of the distributed information processing system;

computer program code for configuring the replicated complex asset at a second time in a connected communicative state at the second site of the distributed information processing system to facilitate recovery at the second site from a failure in the complex asset at the first site;

replicating a second replica of the complex asset from the first site of the distributed information processing system to the second site of the distributed information processing system, wherein the second replica of the complex asset includes: (i) a snapshot of a first portion of the second replica of the complex asset and (ii) a second portion of the second replica of the complex asset;

configuring the second replicated complex asset at a third time in the active operational state but in the disconnected communicative state at the second site of the distributed information processing system; and recovering the second replica of the complex asset at the second site according to the snapshot of the first portion of the second replica of the complex asset and the second portion of the second replica of the complex asset.

* * * * *